US012810527B2

(12) United States Patent
Sugimoto et al.

(10) Patent No.: US 12,810,527 B2
(45) Date of Patent: Nov. 24, 2026

(54) RETRIEVING DIFFUSION CURVES AND GENERATING VECTOR GRAPHIC IMAGES FROM MONTE CARLO RENDERING SAMPLES

(71) Applicants: Adobe Inc., San Jose, CA (US); Toshiya Hachisuka, San Jose, CA (US); Christopher Batty, San Jose, CA (US)

(72) Inventors: Ryusuke Sugimoto, Waterloo (CA); Michal Lukac, San Jose, CA (US); Siddhartha Chaudhuri, New Haven, CT (US); Kevin Wampler, Seattle, WA (US); Iliyan Georgiev, London (GB); Toshiya Hachisuka, Waterloo (CA); Christopher Batty, Guelph (CA)

(73) Assignee: Adobe Inc., San Jose, CA (US)

( * ) Notice: Subject to any disclaimer, the term of this patent is extended or adjusted under 35 U.S.C. 154(b) by 85 days.

(21) Appl. No.: 19/065,278

(22) Filed: Feb. 27, 2025

(65) Prior Publication Data

US 2026/0253307 A1 Aug. 27, 2026

(51) Int. Cl.
*G06T 15/04* (2011.01)

(52) U.S. Cl.
CPC .................................. *G06T 15/04* (2013.01)

(58) Field of Classification Search
None
See application file for complete search history.

(56) References Cited

U.S. PATENT DOCUMENTS

2025/0117968 A1* 4/2025 Hinz ...................... G06T 11/00

OTHER PUBLICATIONS

Ryusuke Sugimoto, Christopher Batty, Siddhartha Chaudhuri, Iliyan Georgiev, Toshiya Hachisuka, Kevin Wampler, Michal Lukáč, "Monte Carlo Rendering to Diffusion Curves with Differential BEM", arXiv:2602.05492v1, pp. 1-12 (Year: 2026).*

Adobe Inc. "Adobe Illustrator". Webpage <https://www.adobe.com/products/illustrator.html>, 3 pages, Oct. 16, 2019, retrieved from the Internet Wayback Machine <https://web.archive.org/web/20190101000000*/https://www.adobe.com/products/illustrator.html> on Apr. 18, 2025.

(Continued)

*Primary Examiner* — Michael J Cobb
(74) *Attorney, Agent, or Firm* — Keller Preece PLLC

(57) ABSTRACT

The present disclosure relates to systems, methods, and non-transitory computer-readable media that generates a vector graphic image from a modified diffusion curve. Furthermore, the disclosed systems generate Monte Carlo rendering color estimates for corresponding subpoints of an image of a three-dimensional digital scene. Moreover, the disclosed systems generate Monte Carlo PDE color estimates for corresponding subpositions within a target image of the three-dimensional digital scene by using Monte Carlo PDE model parameterized by a diffusion curve. Further, the disclosed systems generate a modified diffusion curve from the diffusion curve by comparing the Monte Carlo rendering color estimates with the Monte Carlo PDE color estimates. From the modified diffusion curve, the disclosed systems generate the vector graphic image of the three-dimensional digital scene.

20 Claims, 9 Drawing Sheets

(56) References Cited

OTHER PUBLICATIONS

Alexandrina Orzan, Adrien Bousseau, Holger Winnemöller, Pascal Barla, Joëlle Thollot, and David Salesin. "Diffusion Curves: A Vector Representation for Smooth-Shaded Images". In ACM SIGGRAPH 2008 Papers (Los Angeles, California) (SIGGRAPH '08). Association for Computing Machinery, New York, NY, USA, Article 92, 8 pages, 2008. https://doi.org/10.1145/1399504.1360691.
Aryan Mokhtari and Alejandro Ribeiro. "Stochastic Quasi-Newton Methods". In Proceedings of the IEEE, vol. 108, No. 11, pp. 1906-1922. Nov. 2020. https://doi.org/10.1109/JPROC.2020.3023660.
Bailey Miller, Rohan Sawhney, Keenan Crane, and Ioannis Gkioulekas. "Boundary Value Caching for Walk on Spheres". ACM Transactions on Graphics (TOG), vol. 42, Issue 4, Article 82 (Jul. 2023), 11 pages. Jul. 2023. https://doi.org/10.1145/3592400.
Bailey Miller, Rohan Sawhney, Keenan Crane, and Ioannis Gkioulekas. "Differential Walk on Spheres". ACM Transactions on Graphics (TOG). vol. 43, Issue 6, Article 174 (Nov. 2024), 18 pages. Nov. 2024. https://doi.org/10.1145/3687913.
Baptiste Nicolet, Fabrice Rousselle, Jan Novak, Alexander Keller, Wenzel Jakob, and Thomas Müller. "Recursive Control Variates for Inverse Rendering". ACM Transactions on Graphics (TOG). vol. 42, Issue 4, Article 62, 13 pages. Jul. 2023. https://dl.acm.org/doi/10.1145/3592139.
Ekrem Fatih Yilmazer, Delio Vicini, and Wenzel Jakob. "Solving Inverse PDE Problems using Grid-Free Monte Carlo Estimators". ACM Transactions on Graphics (TOG), vol. 43, Issue 6, Article 175, 18 pages. Nov. 2024. https://doi.org/10.1145/3687990.
Ghada Bakbouk and Pieter Peers. "Mean Value Caching for Walk on Spheres". In Eurographics Symposium on Rendering, Tobias Ritschel and Andrea Weidlich (Eds.). The Eurographics Association. 10 pages, 2023. https://doi.org/10.2312/sr.20231120.
Guofu Xie, Xin Sun, Xin Tong, and Derek Nowrouzezahrai. "Hierarchical Diffusion Curves for Accurate Automatic Image Vectorization". ACM Transactions on Graphics (TOG). vol. 33, Issue 6, Article 230, 11 pages. Nov. 2014. https://doi.org/10.1145/2661229.2661275.
Jasper van de Gronde. "A High Quality Solver for Diffusion Curves". Master's Thesis. University of Groningen. 42 pages, 2010. https://fse.studenttheses.ub.rug.nl/id/eprint/9496.
Jiong Chen, Florian Schaefer, and Mathieu Desbrun. "Lightning-Fast Method of Fundamental Solutions". ACM Transactions on Graphics (TOG). vol. 43, Issue 4, Article 77, 17 pages. Jul. 2024. https://doi.org/10.1145/3658199.
John C. Bowers, Jonathan Leahey, and Rui Wang. "A Ray Tracing Approach to Diffusion Curves". Computer Graphics Forum. vol. 30, Issue 4, pp. 1345-1352, Jul. 2011. https://doi.org//10.1111/j.1467-8659.2011.01994.x.
Jorge Nocedal and Stephen J. Wright. "Numerical Optimization" (2nd ed. ed.). Springer, New York. 686 pages, 2006.
Lawrence C. Evans. "Partial Differential Equations". American Mathematical Society, Providence, R.I., 664 pages. 1998.
Mark Finch, John Snyder, and Hugues Hoppe. "Freeform Vector Graphics with Controlled Thin-Plate Splines". ACM Transactions on Graphics (TOG). vol. 30, Issue 6, pp. 1-10, Dec. 2011. https://doi.org/10.1145/2070781.2024200.
Markus Kettunen, Eugene D'Eon, Jacopo Pantaleoni, and Jan Novák. "An Unbiased Ray-Marching Transmittance Estimator". ACM Transactions on Graphics (TOG), vol. 40, Issue 4, Article 137, 20 pages. Jul. 2021. https://doi.org/10.1145/3450626.3459937.
Mervin E Muller. "Some Continuous Monte Carlo Methods for the Dirichlet Problem". The Annals of Mathematical Statistics (1956), pp. 569-589. 1956.
Peter Ilbery, Luke Kendall, Cyril Concolato, and Michael McCosker. "Biharmonic Diffusion Curve Images from Boundary Elements". ACM Transactions on Graphics (TOG), vol. 32, Issue 6, Article 219, 12 pages, Nov. 2013. https://doi.org/10.1145/2508363.2508426.
Peter Selinger. "Potrace: A Polygon-Based Tracing Algorithm". 16 pages, Sep. 20, 2003.
Peter Shirley, Trevor David Black, and Steve Hollasch. "Ray Tracing: The Rest of Your Life" (v4.0.2 ed.). 90 pages, Aug. 2025.
Rohan Sawhney and Keenan Crane. "Monte Carlo Geometry Processing: A Grid-Free Approach to PDE-Based Methods on Volumetric Domains". ACM Transactions on Graphics (TOG), vol. 39, Issue 4, Article 123, 18 pages. Aug. 2020. https://doi.org/10.1145/3386569.3392374.
Rohan Sawhney, Bailey Miller, Ioannis Gkioulekas, and Keenan Crane. "Walk on Stars: A Grid-Free Monte Carlo Method for PDEs with Neumann Boundary Conditions". ACM Transactions on Graphics (TOG), vol. 42, Issue 4, Article 80, 20 pages. Jul. 2023. https://doi.org/10.1145/3592398.
Romain Prévost, Wojciech Jarosz, and Olga Sorkine-Hornung. "A Vectorial Framework for Ray Traced Diffusion Curves". Computer Graphics Forum, vol. 34, Issue 1, 11 pages. Feb. 2015. https://doi.org/10.1111/cgf.12510.
Ryusuke Sugimoto, Terry Chen, Yiti Jiang, Christopher Batty, and Toshiya Hachisuka. "A Practical Walk-on-Boundary Method for Boundary Value Problems". 16 pages, arXiv preprint arXiv:2305.04403v2, May 19, 2023.
Seungbae Bang, Kirill Serkh, Oded Stein, and Alec Jacobson. "An Adaptive Fast-Multipole-Accelerated Hybrid Boundary Integral Equation Method for Accurate Diffusion Curves". ACM Transactions on Graphics (TOG), vol. 42, Issue 6, Article 215, 28 pages. Dec. 2023. https://doi.org/10.1145/3618374.
Shuang Zhao, Frédo Durand, and Changxi Zheng. "Inverse Diffusion Curves Using Shape Optimization". IEEE Transactions on Visualization and Computer Graphics, vol. 24, Issue 7, pp. 2153-2166. Jul. 2018. https://doi.org/10.1109/TVCG.2017.2721400.
Simon Boyé, Pascal Barla, and Gaël Guennebaud. "A Vectorial Solver for Freeform Vector Gradients". ACM Transactions on Graphics (TOG), vol. 31, Issue 6, Article 173, 10 pages. Nov. 2012. https://doi.org/10.1145/2366145.2366192.
Stefan Jeschke, David Cline, and Peter Wonka. "Estimating Color and Texture Parameters for Vector Graphics". Computer Graphics Forum, vol. 30, Issue 2, 16 pages, 2011. https://doi.org/10.1111/j.1467-8659.2011.01877.x.
Stefan Jeschke, David Cline, and Peter Wonka. "A Gpu Laplacian Solver for Diffusion Curves and Poisson Image Editing". ACM Transactions on Graphics (TOG), vol. 28, Issue 5, pp. 1-8, Dec. 2009. https://doi.org/10.1145/1618452.1618462.
Stefan Jeschke. "Generalized Diffusion Curves: An Improved Vector Representation for Smooth-Shaded Images". Eurographics Computer Graphics Forum vol. 35, No. 2, 7 pp. 1-9. 2016. https://onlinelibrary.wiley.com/doi/pdf/10.1111/cgf.12812.
Stefania Bellavia, Serge Gratton, and Elisa Riccietti. "A Levenberg-Marquardt Method for Large Nonlinear Least-Squares Problems with Dynamic Accuracy in Functions and Gradients". Numerische Mathematik, vol. 140, Issue 3, pp. 791-825. Nov. 2018. https://doi.org/10.1007/s00211-018-0977-z.
Stephen Joe and Frances Y. Kuo. "Constructing Sobol Sequences with Better Two-Dimensional Projections". Society for Industrial and Applied Mathematics (SIAM) Journal on Scientific Computing, vol. 30, Issue 5, pp. 2635-2654. Aug. 2008. https://doi.org/10.1137/070709359.
Tian-De Guo, Yan Liu, and Cong-Ying Han. "An Overview of Stochastic Quasi-Newton Methods for Large-Scale Machine Learning". Journal of the Operations Research Society of China vol. 11, No. 2, pp. 245-275, Feb. 2023. https://doi.org/10.1007/s40305-023-00453-9.
Tianyu Huang, Jingwang Ling, Shuang Zhao, and Feng Xu. "Path Guiding for Monte Carlo PDE Solvers". 8 pages, arXiv preprint arXiv:2410.18944, Oct. 24, 2024.
Timothy Sun, Papoj Thamjaroenporn, and Changxi Zheng. "Fast Multipole Representation of Diffusion Curves and Points". ACM Transactions on Graphics (TOG), vol. 33, Issue 4, Article 53, 12 pages. Jul. 2014. https://doi.org/10.1145/2601097.2601187.
Tzu-Mao Li, Michal Lukáč, Michaël Gharbi, and Jonathan Ragan-Kelley. "Differentiable Vector Graphics Rasterization for Editing

(56) References Cited

OTHER PUBLICATIONS and Learning". ACM Transactions on Graphics (TOG), vol. 39, Issue 6, Article 193, 15 pages. Nov. 2020. https://doi.org/10.1145/3414685.3417871.

Wai-Man Pang, Jing Qin, Michael Cohen, Pheng-Ann Heng, and Kup-Sze Choi. "Fast Rendering of Diffusion Curves with Triangles". IEEE Computer Graphics and Applications, vol. 32, Issue 4, pp. 68-78. 2012. Jul. 2012. https://doi.org/10.1109/MCG.2011.86.

Wen Dai, Tao Luo, and Jianbing Shen. "Automatic Image Vectorization using Superpixels and Random Walkers". In 2013 6th International Congress on Image and Signal Processing (CISP), vol. 2. pp. 922-926. 2013. https://doi.org/10.1109/CISP.2013.6745296.

Xin Sun, Guofu Xie, Yue Dong, Stephen Lin, Weiwei Xu, Wencheng Wang, Xin Tong, and Baining Guo. "Diffusion Curve Textures for Resolution Independent Texture Mapping", ACM Transactions on Graphics (TOG), vol. 31, Issue 4, Article 74, 9 pages. Jul. 2012. https://dl.acm.org/doi/10.1145/2185520.2185570.

Xingze Tian and Tobias Günther. "A Survey of Smooth Vector Graphics: Recent Advances in Representation, Creation, Rasterization, and Image Vectorization". IEEE Transactions on Visualization and Computer Graphics, vol. 30, Issue 3, pp. 652-1671. 2024. https://doi.org/10.1109/TVCG.2022.3220575.

Yang Qi, Dario Seyb, Benedikt Bitterli, and Wojciech Jarosz. "A Bidirectional Formulation for Walk on Spheres". Computer Graphics Forum 41, 4, pp. 51-62. 2022. https://par.nsf.gov/biblio/10381119-bidirectional-formulation-walk-spheres.

Yingjie Tian, Yuqi Zhang, and Haibin Zhang. "Recent Advances in Stochastic Gradient Descent in Deep Learning". Mathematics, vol. 11, Issue 3, 23 pages, 2023. https://doi.org/10.3390/math11030682.

Zihan Yu, LifanWu, Zhiqian Zhou, and Shuang Zhao. "A Differential Monte Carlo Solver for the Poisson Equation". In ACM SIGGRAPH 2024 Conference Papers (Denver, CO, USA) (SIGGRAPH '24). Association for Computing Machinery, New York, NY, USA, Article 11, 10 pages. 2024. https://doi.org/10.1145/3641519.3657460.

Zilu Li, Guandao Yang, Xi Deng, Christopher De Sa, Bharath Hariharan, and Steve Marschner. "Neural Caches for Monte Carlo Partial Differential Equation Solvers". In SIGGRAPH Asia 2023 Conference Papers (Sydney, NSW, Australia) (SA '23). Association for Computing Machinery, New York, NY, USA, Article 34, 10 pages. 2023. https://doi.org/10.1145/3610548.3618141.

Zilu Li, Guandao Yang, Qingqing Zhao, Xi Deng, Leonidas Guibas, Bharath Hariharan, and Gordon Wetzstein. "Neural Control Variates with Automatic Integration". In ACM SIGGRAPH 2024 Conference Papers (Denver, CO, USA) (SIGGRAPH '24). Association for Computing Machinery, New York, NY, USA, Article 10, 10 pages. Jul. 2024. https://doi.org/10.1145/3641519.3657395.

* cited by examiner

RETRIEVING DIFFUSION CURVES AND GENERATING VECTOR GRAPHIC IMAGES FROM MONTE CARLO RENDERING SAMPLES

BACKGROUND

Recent years have seen significant advancement in hardware and software platforms for rendering vector graphic images. Indeed, systems provide a variety of ways to optimize a vector graphic image from a rasterized version of a scene. For instance, systems can receive input image data, transform the input image data into a raster image, and then further produce a vector graphic image from the raster image. Despite the advances in rendering vector graphic images, systems suffer from a number of deficiencies with regards to accuracy, efficiency, and operational flexibility.

SUMMARY

One or more embodiments described herein provide benefits and/or solve one or more problems in the art with systems, methods, and non-transitory computer-readable media that generate vector graphics from diffusion curve handles generated from noisy samples of a Monte Carlo renderer. Specifically, the disclosed systems generate a vector graphic image from a three-dimensional digital scene by optimizing position, existence, and color of diffusion curve handles. To illustrate, in one or more embodiments, disclosed systems utilize a Monte Carlo rendering model and a Monte Carlo partial differential equation (PDE) model to generate color estimates for an optimization process. For instance, the disclosed systems perform an optimization process to bring Monte Carlo PDE color estimates closer to Monte Carlo rendering color estimates. Moreover, in some embodiments, the disclosed systems generate a modified diffusion curve from the optimization process. In particular, the modified diffusion curve includes diffusion curve handles and the disclosed systems utilize the diffusion curve handles to generate the vector graphic image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
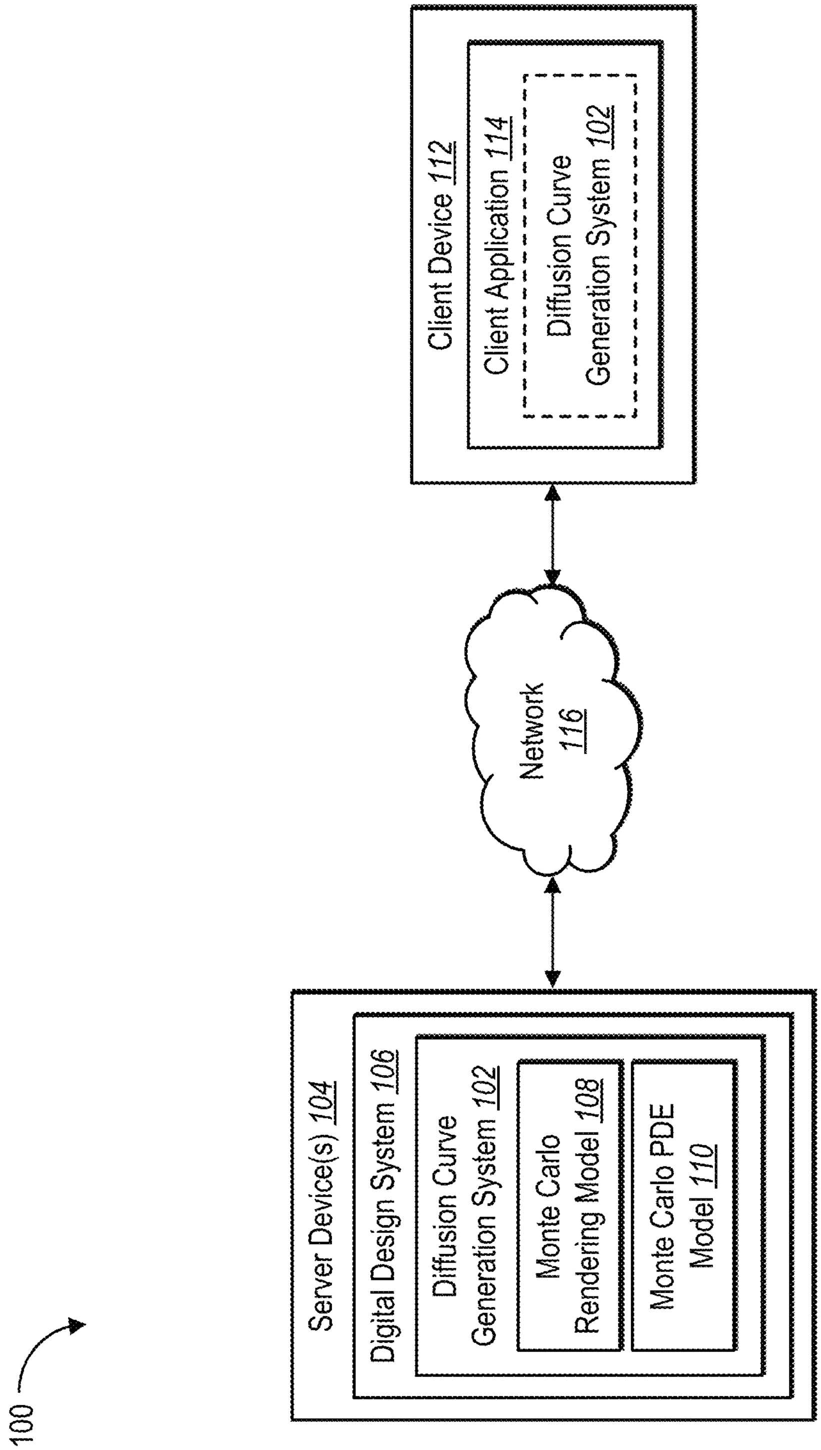
FIG. 1 illustrates an example environment in which a diffusion curve generation system operates in accordance with one or more implementations.

One or more embodiments described herein includes a diffusion curve generation system that retrieves diffusion curve handles directly from noisy samples of a Monte Carlo rendering model to directly render vector graphic images from a three-dimensional digital scene. In one or more implementations, the diffusion curve generation system bypasses a step of rendering to a raster image and directly renders a vector graphic image from diffusion curve handles obtained from noisy samples (e.g., the diffusion curve generation system renders the vector graphic image without being bound to a specific resolution of the three-dimensional digital scene). In particular, the diffusion curve generation system formulates a stochastic optimization problem (e.g., finding optimal positions and colors of diffusion curve handles, such that a reconstructed image accurately matches a target image of the three-dimensional digital scene) to solve for generating a modified diffusion curve of a scene by iteratively comparing Monte Carlo rendering color estimates with Monte Carlo PDE color estimates. In one or more embodiments, the diffusion curve generation system utilizes the Monte Carlo PDE model that is parameterized by a diffusion curve, and through stochastic optimization, the diffusion curve generation system optimizes the parameters (e.g., the diffusion handles) of the Monte Carlo PDE model such that the diffusion curve generation system accurately generates a vector graphic image of the three-dimensional digital scene.

In one or more embodiments, the diffusion curve generation system generates a loss gradient estimate (and Hessian estimate) from comparing the Monte Carlo rendering color estimates with the Monte Carlo PDE color estimates and generates the modified diffusion curve based on the comparison. In some embodiments, the diffusion curve generation system minimizes the loss gradient estimate. In particular, the loss gradient estimate is generated by analyzing a difference between a target image color (e.g., the three-dimensional digital scene as rendered by the Monte Carlo rendering model) and a reconstructed image color (e.g., vector graphic image) at random positions within an image space of the three-dimensional digital scene. In some embodiments, the diffusion curve generation system modifies an initial diffusion curve (e.g., that includes initial positions and colors), based on the loss gradient estimate, such that the modified diffusion curve includes modified positions and modified colors. Moreover, from the modified positions and modified colors, the diffusion curve generation system interpolates color values for a remainder of the vector graphic image.

In one or more embodiments, the diffusion curve generation system generates a loss Hessian estimate using a Gauss-Newton optimization model to optimize the positions of diffusion handles in a diffusion curve. In particular, the diffusion curve generation system evaluates a noisy gradient at randomly sampled image points and uses the stochastic Gauss-Newton optimization for faster and more stable determination of ideal positions of the diffusion handles.

In one or more embodiments, the diffusion curve generation system removes excessive handles by optimizing the existence of diffusion curve handles. In particular, the diffusion curve generation system selects a subset of diffusion handles in a diffusion curve by using a Poisson source evaluation model that weights diffusion handles by modeling gradients with respect to diffusion handle existence. In other words, the diffusion curve generation system determines a likelihood/probability of a diffusion handle existing, and removes diffusion handles that optimize the difference between a target image color (e.g., the three-dimensional digital scene as rendered by the Monte Carlo rendering model) and a reconstructed image color (e.g., vector graphic image). Thus, the diffusion curve generation system generates a modified diffusion curve with a reduced number of total diffusion handles relative to an initial diffusion curve that parameterizes the Monte Carlo PDE model.

In one or more implementations, the diffusion curve generation system utilizes a two-step optimization process for determining diffusion handles. In particular, the diffusion curve generation system determines modified positions and a modified number of diffusion handles utilizing the Poisson source evaluation model in a first step/process. The diffusion curve generation system then determines a modified color of diffusion handles by comparing a loss gradient in a second step/process.

As mentioned above, existing systems suffer from a number of issues relating to computational accuracy, efficiency, and operational flexibility. For example, existing systems suffer from computational inaccuracies due to generating noisy estimates and corresponding noisy vector graphics. In particular, existing systems often fully render an input scene into a raster image and then estimate a diffusion curve from this rendered raster image. Although this approach can generate a diffusion curve, the estimated rendering and corresponding vector graphics are often inaccurate and noisy. In other words, existing systems struggle with the technological process of generating a realistic vector graphic representation from a three-dimensional scene.

Additionally, in some embodiments, existing systems require knowledge about an input scene. In particular, existing systems typically require an initial diffusion curve or initially rendering an input scene into a raster image. As such, when existing systems attempt to render vector graphics, existing systems are bound to a specific resolution/quality of the input scene. Thus, existing systems generate inaccurate vector graphics that are tied to a specific resolution/quality of a raster image.

Relatedly, existing systems also suffer from various computational inefficiencies. For example, existing systems often generate diffusion curves that contain an excessive number of handles. In particular, because existing systems work with an excessive number of handles, existing systems also require an increased amount of time and resources to render vector graphic images based on estimating the handles and interpolating colors to generate vector graphics.

Furthermore, in some embodiments, existing systems further suffer from computational inefficiencies due to existing systems requiring knowledge about an input scene. In particular, existing systems require knowledge such as an input scene in the form of an initial diffusion curve or a raster image. Moreover, existing systems use an initial diffusion curve or a raster image to begin producing an initial estimate for optimization. In other words, existing systems assume information about the target image (e.g., the three-dimensional digital scene) based on the initial input data in order to attempt to render a vector graphic image. Thus, existing systems inefficiently generate vector graphics where the input data is bound to a specific resolution (e.g., from rendering to a raster image) which in some instances require re-prompting of the system.

In some embodiments, as mentioned above, existing systems are required to convert a three-dimensional digital scene to a rasterized version of an image before being able to render the scene into a vector graphic image. As such, existing systems rigidly require multiple steps and excessive computational processes to accomplish the task of rendering a vector graphic image.

In one or more embodiments, the diffusion curve generation system provides several improvements over existing systems in relation to accuracy, efficiency, and operational flexibility. As mentioned above, existing systems utilize processes that result in generating noisy estimates. In contrast, the diffusion curve generation system performs an iterative optimization process to identify on an improved number of diffusion handles, positions of diffusion handles, and colors of diffusion handles. As a result, the diffusion curve generation system generates a modified diffusion curve of the three-dimensional digital scene and further generates a vector graphic image from the modified diffusion curve. Thus, in some embodiments, the diffusion curve generation system more accurately generates a vector graphic image that reflects a three-dimensional digital scene with reduced noise and inaccuracies.

As also mentioned above, existing systems also generate diffusion curves with an excessive number of handles. In contrast, the diffusion curve generation system performs an optimization process that queries points in an image space of the three-dimensional digital scene, which starts with a set of handles and removes a subset of the handles as the optimization process progresses. In particular, the diffusion curve generation system uses a Poisson source evaluation model that weights diffusion handles (e.g., based on a gradient of the diffusion handles with respect to diffusion handle existence) to select the subset of handles to remove. As a result of removing the subset of handles (e.g., excessive handles), the diffusion curve generation system more accurately creates a vector graphic image from a more efficient number of diffusion handles (e.g., optimal with respect to a target image).

Moreover, in contrast to existing systems which require an initial diffusion curve or initially rendering an input scene into a raster image, the diffusion curve generation system is not bound to a specific resolution/quality of the input scene because the diffusion curve generation system can directly sample from Monte Carlo rendering color estimates and generates corresponding Monte Carlo PDE color estimates. As such, the diffusion curve generation system more accurately generates a vector graphic image from data that is resolution independent.

Additionally, as mentioned, existing systems suffer from computational inefficiencies due to diffusion curves containing an excessive number of handles. In contrast with existing systems, the diffusion curve generation system modifies a diffusion curve to remove a subset of the diffusion handles which increases the efficiency of generating vector graphic images. In particular, the iterative comparison of Monte Carlo rendering color estimates with Monte Carlo PDE color estimates allows for the diffusion curve generation system to optimize for existence of diffusion handles in a diffusion curve. As such, the diffusion curve generation system more effectively generates vector graphic images due to the modified diffusion curve containing a reduced number of diffusion curve handles relative to an initial diffusion curve.

In contrast with existing systems which require knowledge about an input scene, the diffusion curve generation system does not need to assume any information about the target image (e.g., the three-dimensional digital scene). Instead, the diffusion curve generation system obtains Monte Carlo rendering color estimates of the three-dimensional digital scene at arbitrary query points, and Monte Carlo PDE color estimates for a corresponding subposition within the target image to optimize the existence, position, and color of diffusion handles. As such, the diffusion curve generation system more effectively renders vector graphic images by directly sampling from the Monte Carlo rendering color estimates to arrive at the vector graphic image.

Additionally, as alluded to above, the diffusion curve generation system also directly renders a vector graphic image from a three-dimensional digital scene without first requiring rendering to a rasterized image. In particular, the diffusion curve generation system improves operational flexibility relative to existing systems by flexibly going directly from the three-dimensional digital scene to a vector graphic image (e.g., bypassing a step of rendering to a rasterized image of the scene).

Additional details regarding the diffusion curve generation system will now be provided with reference to the figures. For example, FIG. 1 illustrates a schematic diagram of an exemplary system environment 100 in which a diffusion curve generation system 102 operates. As illustrated in FIG. 1, the system environment 100 includes server device(s) 104, a digital design system 106, a network 116, and a client device 112. Additionally, FIG. 1 illustrates that the digital design system 106 includes the diffusion curve generation system 102, which includes a Monte Carlo rendering model 108 and a Monte Carlo PDE model 110. Moreover, the client device 112 includes a client application 114 (e.g., a client side digital media editing application).

Although the system environment 100 of FIG. 1 is depicted as having a particular number of components, the system environment 100 is capable of having a different number of additional or alternative components (e.g., a different number of server devices, client devices, or other components in communication with the diffusion curve generation system 102 via the network 116). Similarly, although FIG. 1 illustrates a particular arrangement of the server device(s) 104, the network 116, and the client device 112, various additional arrangements are possible.

The server device(s) 104 and the client device 112 are communicatively coupled with each other either directly or indirectly (e.g., through the network 116 discussed in greater detail below in relation to FIG. 9). Moreover, the server device(s) 104 and the client device 112 include one or more of a variety of computing devices (including one or more computing devices as discussed in greater detail in relation to FIG. 9).

As mentioned above, the system environment 100 includes the server device(s) 104. In one or more embodiments, the server device(s) 104 process a request to render a vector graphic image from a three-dimensional digital scene (e.g., by employing one or more models such as the Monte Carlo rendering model 108 or the Monte Carlo PDE model 110). In one or more embodiments, the server device(s) 104 comprise a data server. In some implementations, the server device(s) 104 comprise a communication server or a web-hosting server.

In some embodiments, the client device 112 is associated with the one or more user accounts that submit requests to generate a three-dimensional digital scene and further submit requests to generate a vector graphic image from the three-dimensional digital scene. In one or more embodiments, the client device 112 includes smartphones, tablets, desktop computers, laptop computers, head-mounted-display devices, or other electronic devices. The client device 112 includes one or more software applications (e.g., the client application 114) for generating/rendering three-dimensional digital scenes and/or vector graphic images in accordance with the digital design system 106. In one or more embodiments, the client application 114 includes a software application hosted on the server device(s) 104 accessible by the client device 112 through another application, such as a web browser.

To provide an example implementation, in some embodiments, the digital design system 106 on the server device(s) 104 supports the client application 114 on the client device 112. For instance, in some cases, the diffusion curve generation system 102 on the server device(s) 104 modifies the Monte Carlo PDE model 110 that is parameterized by a diffusion curve based on Monte Carlo rendering color estimates from the Monte Carlo rendering model 108. In response, the diffusion curve generation system 102, via the server device(s) 104, provides a modified diffusion curve (e.g., the Monte Carlo PDE model 110) to the client device 112.

In other words, the client device 112 obtains (e.g., downloads) a modified diffusion curve (e.g., that parameterizes the Monte Carlo PDE model 110) from the server device(s) 104. Once downloaded, the diffusion curve generation system 102 on the client device 112 is able to render/generate a vector graphic image from the modified diffusion curve independent from the server device(s) 104. In one or more alternative implementations, the diffusion curve generation system 102 generates the modified diffusion curve of the Monte Carlo PDE model 110 in whole or in part on the client device 112.

In alternative implementations, the digital design system 106 includes a web hosting application that allows the client device 112 to interact with content and services hosted on the server device(s) 104. To illustrate, in one or more implementations, the client device 112 accesses a software application supported by the server device(s) 104. In response, the digital design system 106 on the server device(s) 104 provides tools for creating a three-dimensional digital scene or rendering a vector graphic image from the three-dimensional digital scene. In other words, the client device 112 does not have to download the diffusion curve generation system 102, the Monte Carlo rendering model 108, or the Monte Carlo PDE model 110 while still being able to access/utilize the tools provided by the digital design system 106 via a web hosting application.

In some embodiments, the diffusion curve generation system 102 is implemented in whole, or in part, by the individual elements of the system environment 100. For instance, although FIG. 1 illustrates the diffusion curve generation system 102 implemented or hosted on the server device(s) 104, different components of the diffusion curve generation system 102 are able to be implemented by a variety of devices within the system environment 100. For example, one or more (or all) components of the diffusion curve generation system 102 are implemented by a different computing device or a separate server from the server device(s) 104. Indeed, as shown in FIG. 1, the client device 112 includes the diffusion curve generation system 102. Example components of the diffusion curve generation system 102 will be described below with regard to FIG. 7.

Figure 2:
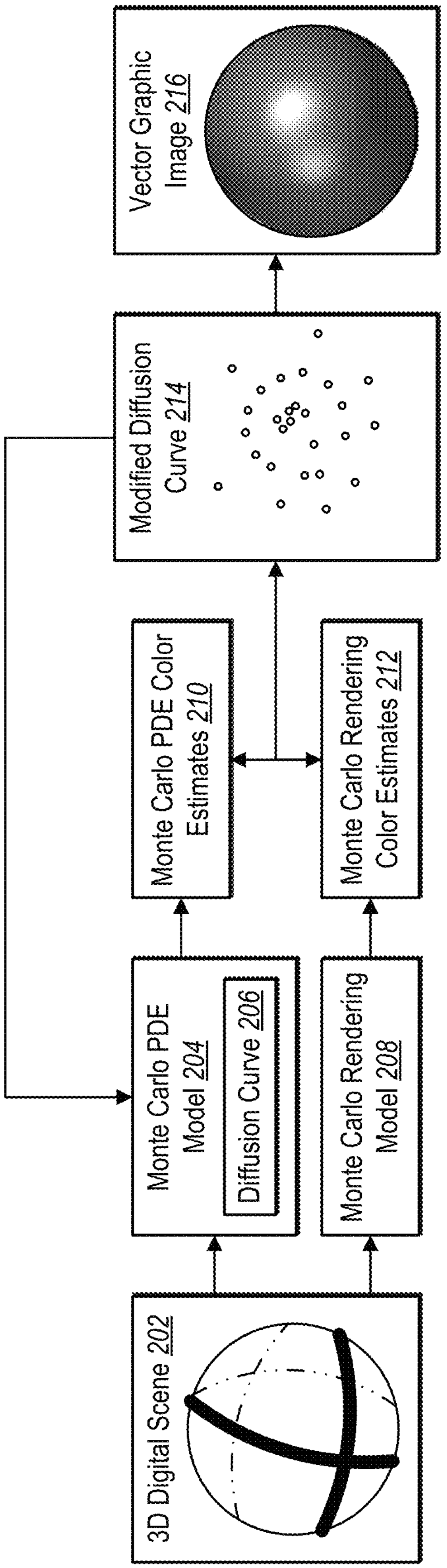
FIG. 2 illustrates an overview of the diffusion curve generation system using a Monte Carlo PDE model and a Monte Carlo rendering model to generate a modified diffusion curve in accordance with one or more implementations.

As mentioned above, in certain embodiments, the diffusion curve generation system 102 utilizes both a Monte Carlo PDE model and a Monte Carlo rendering model to generate a vector graphic image. FIG. 2 illustrates an overview of the diffusion curve generation system 102 generating a modified diffusion curve from a diffusion curve that parameterizes the Monte Carlo PDE model in accordance with one or more embodiments.

FIG. 2 illustrates the diffusion curve generation system 102 receiving a three-dimensional digital scene 202. In one or more embodiments, the three-dimensional digital scene 202 refers to an environment created using three-dimensional modeling and rendering software. In particular, a three-dimensional digital scene includes three-dimensional objects (e.g., buildings, nature, humans, animals, etc.), materials (e.g., matte surface, transparent surface, shiny surface, etc. which defines how surfaces in the three-dimensional digital scene 202 interact with light), lighting (e.g., illumination in the three-dimensional digital scene 202, shadows, different types of lights, etc.), textures (e.g., color, roughness, patterns, etc.), and camera positions (e.g., camera configurations that define various viewpoints from which the three-dimensional digital scene 202 is viewed).

In one or more embodiments, the diffusion curve generation system 102 receives the three-dimensional digital scene 202 in response to a request to render a vector graphic image. In some embodiments, a request to render refers to a request submitted from a user of a computing device to generate a two-dimensional image from the three-dimensional digital scene 202. In particular, the request to render includes a request to render directly from the three-dimensional digital scene 202 to a vector graphic image. For instance, in response to the request to render, the disclosed system calculates and simulates how light interacts with objects, materials, and textures within the three-dimensional digital scene 202 to produce a visual output (e.g., the vector graphic image) from the perspective of a camera position. In other words, the request to render causes the diffusion curve generation system 102 to transform the three-dimensional digital scene 202 (e.g., a collection of geometry and computer data) into a viewable vector graphic image (e.g., viewable on a computing device) from the perspective of a virtual camera within the three-dimensional digital scene 202.

FIG. 2 illustrates the diffusion curve generation system 102 using a Monte Carlo rendering model 208 and a Monte Carlo PDE model 204 to generate Monte Carlo color estimates. Specifically, the diffusion curve generation system 102 uses the Monte Carlo PDE model 204 to generate Monte Carlo PDE color estimates 210 and the Monte Carlo rendering model 208 to generate Monte Carlo rendering color estimates 212.

As also shown in FIG. 2, the Monte Carlo PDE model 204 is parameterized by a diffusion curve 206. For example, a diffusion curve that parameterizes the Monte Carlo PDE model 204 refers to a set of handles associated with one or more colors placed in an image space domain or image space sub-domain. In particular, the set of colored handles of the diffusion curve 206 diffuses colors from the handles to the rest of the image to define the image (e.g., the vector graphic image) in a continuous image space. Additional details of both of these models and the color estimates are provided below in FIG. 3.

Furthermore, FIG. 2 shows the diffusion curve generation system 102 comparing the Monte Carlo PDE color estimates 210 with the Monte Carlo rendering color estimates 212 to generate a modified diffusion curve 214. As mentioned above, the Monte Carlo PDE model 204 is parameterized by the diffusion curve 206. As also mentioned, the diffusion curve 206 refers to a set of handles with corresponding colors placed in an image space domain. In one or more embodiments, the modified diffusion curve 214 refers to a diffusion curve with modified diffusion handles. In particular, in some embodiments, the modified diffusion curve 214 contains modified positions of diffusion handles (e.g., relative to the diffusion curve 206), modified color values, and/or a reduced number of total diffusion handles relative to the diffusion curve 206.

Furthermore, FIG. 2 shows the diffusion curve generation system 102 generating the modified diffusion curve 214 and modifying the Monte Carlo PDE model 204 (e.g., as indicated by the arrow). Specifically, since the Monte Carlo PDE model 204 is parameterized by the diffusion curve 206, the diffusion curve generation system 102 generates the modified diffusion curve 214 and updates the parameters of the Monte Carlo PDE model 204.

Moreover, FIG. 2 shows the diffusion curve generation system 102 generating a vector graphic image 216 from the modified diffusion curve 214. In one or more embodiments, the vector graphic image 216 refers to a digital image defined by shapes, lines, curves, and colors. In particular, the vector graphic image 216 differs from raster graphics in that the vector graphic image 216 is based on geometry such as points, paths, and polygons. In contrast with raster graphics, the vector graphic image 216 is scalable and does not lose quality or become pixelated. For instance, the vector graphic image 216 includes one or more shapes filled with color functions that define how color varies across the vector graphic image 216. Specifically, the vector graphic image includes a diffusion curve that defines how color diffuses across the vector graphic image 216 (e.g., via diffusion handles that define how the color diffuses).

Figure 3:
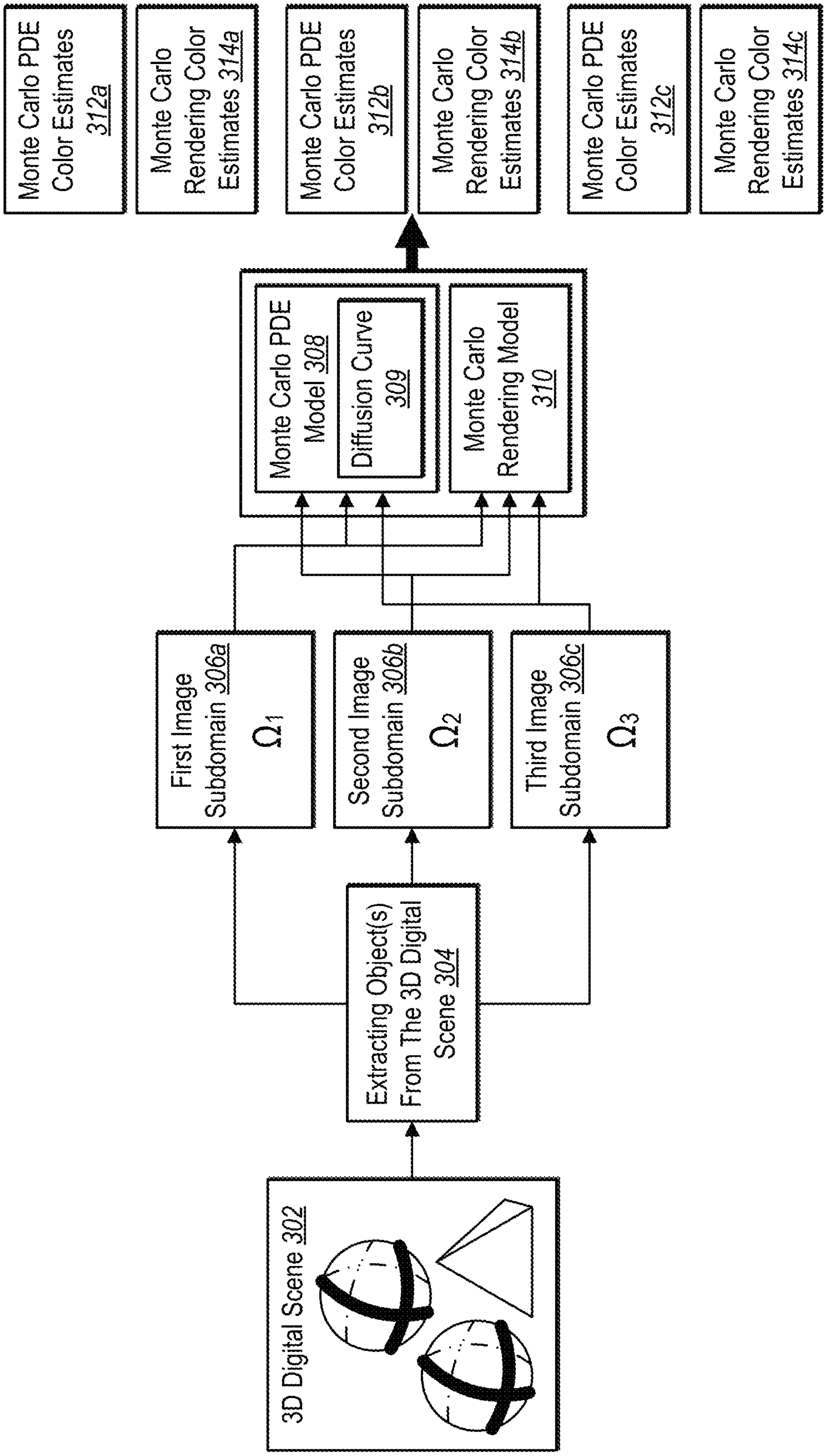
FIG. 3 illustrates an example diagram of the diffusion curve generation system extracting objects from a three-dimensional digital scene and further generating Monte Carlo PDE color estimates and Monte Carlo rendering color estimates in accordance with one or more implementations.

As mentioned above, additional details of the Monte Carlo PDE model and the Monte Carlo rendering model are provided in the description of FIG. 3. FIG. 3 illustrates the diffusion curve generation system 102 extracting objects from a three-dimensional digital scene and further generating color estimates in accordance with one or more embodiments.

As mentioned above, the diffusion curve generation system 102 aims to find a sparse set of handles that reconstructs a target image (e.g., a three-dimensional digital scene 302) with high similarity. Specifically, the diffusion curve generation system 102 primarily focuses on vectorization of a target image generated as a result of rendering three-dimensional digital scenes into an image space via Monte Carlo ray tracing. As also mentioned above, the diffusion curve generation system 102 samples from Monte Carlo rendering samples to directly output a diffusion curve without rendering a raster image in the process.

As shown in FIG. 3, the diffusion curve generation system 102 receives the three-dimensional digital scene 302 and performs an act 304 of extracting object(s) from the three-dimensional digital scene. In particular, the diffusion curve generation system 102 divides an optimization problem for determining a diffusion curve of the three-dimensional digital scene 302 into one or more subdomains. Thus, as shown, the diffusion curve generation system 102 extracts objects from the three-dimensional digital scene 302, such as a first image subdomain 306*a* corresponding to a first object, a second image subdomain 306*b* corresponding to a second object, and a third image subdomain 306*c* corresponding to a third object.

Furthermore, as illustrated, the diffusion curve generation system 102 solves for each image subdomain by using a combination of a Monte Carlo PDE model 308 parameterized by a diffusion curve 309 and a Monte Carlo rendering model 310.

In one or more embodiments, the Monte Carlo rendering model 310 refers to a model that utilizes Monte Carlo approaches to simulate the behavior of light in the three-dimensional digital scene 302 and renders the simulated behavior into a two-dimensional scene. In particular, the Monte Carlo rendering model 310 uses random sampling methods to render color estimates for corresponding subpoints of an image of the three-dimensional digital scene 302. For instance, the diffusion curve generation system 102 uses the Monte Carlo rendering model to query an (arbitrary) point in the three-dimensional digital scene 302 to determine a color estimate (e.g., Monte Carlo rendering color estimate) of that arbitrary point in a target image. For example, the Monte Carlo rendering model can trace (randomly) generated light paths (rays) from a camera into a scene.

The Monte Carlo PDE model 308 refers to a model that utilizes Monte Carlo simulation techniques to solve partial differential equations. In particular, a Monte Carlo PDE model approximates a solution by simulating random processes related to the PDE. Thus, a Monte Carlo PDE model can approximate a solution to a partial differential equation by simulating many random paths of an associated stochastic process.

In one or more embodiments, the diffusion curve generation system 102 modifies a Walk on Spheres method by using a modified Walk on Stars method as the Monte Carlo PDE model 308. For instance, the diffusion curve generation system 102 uses the principles of a Walk on Spheres method as described by Mervin E. Muller 1956, *Some Continuous Monte Carlo methods for the Dirichlet problem*, The Annals of Mathematical Statistics (1956), 569-589, and further builds upon the Walk on Stars method as described by Rohan Sawhney, Bailey Miller, Ioannis Gkioulekas, and Kennan Crane, 2023, *Walk on Stars: A Grid-Free Monte Carlo Method for PDEs with Neumann Boundary Conditions*, ACM Trans. Graph 42, 4, Article 80 (July 2023), 20 pages.

In one or more embodiments, a Walk on Stars method refers to a Monte Carlo method designed to solve partial differential equations with mixed Neumann (e.g., image domain boundary constraints) and Dirichlet boundary conditions (e.g., diffusion handle constraints). In particular, the Walk on Stars method is a simulation of Brownian motion which models Neumann boundary conditions by replacing spheres used in a Walk on Spheres method with star-shaped domains. For instance, the Walk on Stars method creates a Brownian motion simulation to randomly walk around a space (e.g., an image domain) until the simulation runs into a boundary. Specifically, once the Brownian motion simulation runs into a boundary, the diffusion curve generation system 102 obtains the value from that boundary. Moreover, the diffusion curve generation system 102 iteratively performs the Brownian motion simulation and obtains the value of a solution that is the average value of all the boundaries that were encountered during the simulation.

In one or more embodiments, the Monte Carlo PDE model 308 refers to a method of calculating Monte Carlo PDE color estimates for corresponding subpoints within a target image of the three-dimensional digital scene 302 to eventually arrive at the vector graphic image. In particular, the Monte Carlo PDE model 308 calculates pointwise estimations of a solution to compute a gradient of the solution with respect to specific parameters. In other words, the Monte Carlo PDE model 308 can modify/build upon a Walk on Stars method with efficient Neumann boundary support to compute the gradient of the solution. In one or more embodiments, the diffusion curve generation system 102 reformulates the Walk on Stars method of the Monte Carlo PDE model 308 using a Poisson source evaluation model that weights diffusion handles by modeling gradients with respect to diffusion handle existence. This is discussed in more detail below in the description of FIGS. 5 and 6.

As shown in FIG. 3, the diffusion curve generation system 102 generates Monte Carlo rendering color estimates 314*a*, 314*b*, and 314*c* (e.g., corresponding to different image subdomains). In one or more embodiments, the diffusion curve generation system 102 renders the vector graphic image from the three-dimensional digital scene 302 by generating Monte Carlo rendering color estimates for a target image and Monte Carlo PDE color estimates 312*a*, 312*b*, and 312*c* for a reconstructed image.

Further, in some embodiments, the diffusion curve generation system 102 compares the color estimates for the target image and the reconstructed image and iteratively optimizes the reconstructed image to more closely align with the target image. In particular, the diffusion curve generation system 102 generates the Monte Carlo rendering color estimates 314*a*, 314*b*, and 314*c* for a subpoint of a two-dimensional image of the three-dimensional digital scene 302. For instance, a subpoint of an image of the three-dimensional digital scene 302 refers to an intermediate element that is processed to arrive at a target image. In particular, a subpoint of an image further refers to the diffusion curve generation system 102 dividing a two-dimensional scene into a grid, where a subpoint in the image contributes to a color value.

In one or more embodiments, the diffusion curve generation system 102 uses the Monte Carlo rendering model 310 to generate the Monte Carlo rendering color estimates 314*a*, 314*b*, 314*c*. In particular, the diffusion curve generation system 102 generates a Monte Carlo rendering color estimate for a subpoint by casting ray(s) from a camera viewpoint of the three-dimensional digital scene 302 and determining which object(s) or primitive(s) (e.g., geometric feature) the ray hits in the three-dimensional digital scene 302.

For instance, the diffusion curve generation system 102 uses the Monte Carlo rendering model 310 to render a series of random samples (e.g., subpoints of an image of the three-dimensional digital scene 302) to then approximate the Monte Carlo rendering color estimates of the entire target image. In particular, the diffusion curve generation system 102 uses the Monte Carlo rendering model 310 to generate the Monte Carlo rendering color estimates by tracing a path of a light ray and how the light ray bounces off surfaces, scatters, or is absorbed in subpoints of the image domain of the three-dimensional digital scene 302.

In one or more embodiments, the diffusion curve generation system 102 uses the Monte Carlo rendering model 310 to randomly sample from light paths, material properties, and surface interactions of the three-dimensional digital scene 302 to estimate the subportions/subpositions of the target image (e.g., the Monte Carlo rendering color estimates). In particular, the diffusion curve generation system 102 uses the Monte Carlo rendering model 310 to average the Monte Carlo rendering color estimates of the random samples to approximate the subportions/subpositions of the target image.

In one or more embodiments, a target image refers to an estimated image that the diffusion curve generation system 102 uses as a reference to adjust a diffusion curve. In particular, as mentioned, the diffusion curve generation system 102 generates the Monte Carlo rendering color estimates 314*a*, 314*b*, and 314*c* for a target image and Monte Carlo PDE color estimates (e.g., for an image) and modifies a diffusion curve to more closely align with the Monte Carlo rendering color estimates (e.g., the target image).

As shown in FIG. 3, the diffusion curve generation system 102 generates the Monte Carlo PDE color estimates 312*a*, 312*b*, and 312*c* using the Monte Carlo PDE model 308 parameterized by the diffusion curve 309 (e.g., which includes a plurality of diffusion handles). In one or more embodiments, the Monte Carlo PDE color estimates 312*a*, 312*b*, and 312*c* refers to the diffusion curve generation system 102 generating color values/estimates of a reconstructed image for corresponding subpositions within a target image. As mentioned above, the plurality of diffusion handles of the diffusion curve is made up of a plurality of colors and a plurality of positions. Thus, the diffusion curve generation system 102 generates the Monte Carlo PDE color estimates from the plurality of diffusion handles.

In one or more embodiments, the diffusion curve generation system 102 generates the plurality of Monte Carlo PDE color estimates for corresponding subpositions within a target image of the three-dimensional digital scene 302. In particular, the diffusion curve generation system 102 generates a Monte Carlo PDE color estimate in a reconstructed image (e.g., a vector graphic image) for a corresponding subposition in the target image. In other words, the diffusion curve generation system 102 uses the Monte Carlo rendering model 310 to generate a color estimate for a subpoint of an image which results in generating a portion of a target image (e.g., a reference). Further, the diffusion curve generation system 102 uses the Monte Carlo PDE model 308 to generate a color estimate for a vector graphic image that corresponds to a subposition within the target image.

Figure 4:
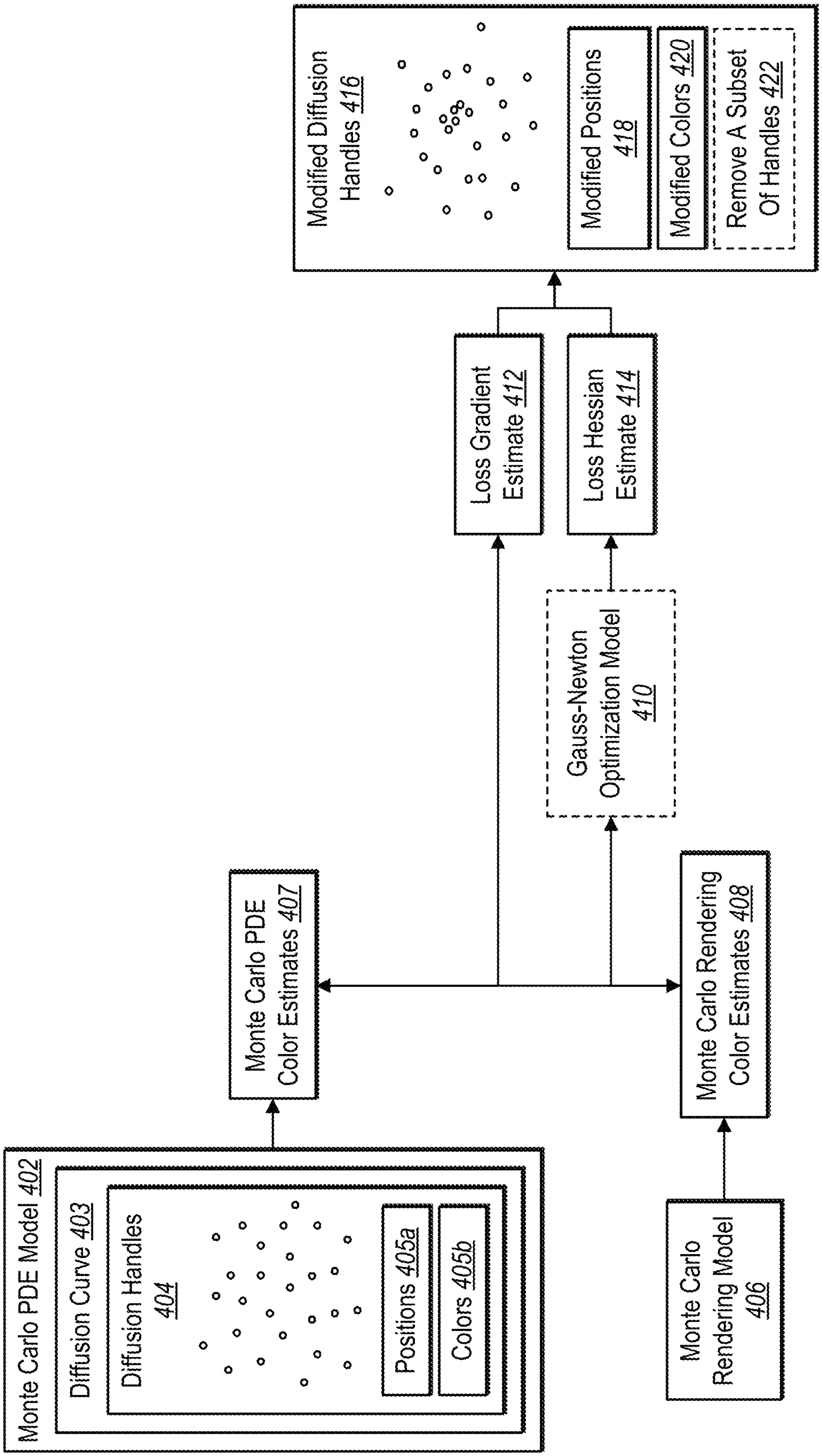
FIG. 4 illustrates an example diagram of the diffusion curve generation system modifying at least one of position, color, or existence of diffusion handles in a diffusion curve in accordance with one or more implementations.

As mentioned above, the diffusion curve generation system 102 generates a modified diffusion curve from loss estimates by comparing Monte Carlo PDE color estimates with Monte Carlo rendering color estimates. FIG. 4 illustrates the diffusion curve generation system 102 modifying at least one of position, color, or existence of diffusion handles in a diffusion curve in accordance with one or more embodiments.

As shown in FIG. 4, the diffusion curve generation system 102 utilizes a Monte Carlo PDE model 402 and a Monte Carlo rendering model 406. Specifically, FIG. 4 shows that the Monte Carlo PDE model 402 is parameterized by diffusion handles 404 of a diffusion curve 403. In one or more embodiments, the diffusion curve 403 defines an image (e.g., reconstructed image) that is the vector graphic image. In particular, at the diffusion handles 404, there are Dirichlet boundary conditions (e.g., a type of constraint used to specify a value of a function on the boundary of its domain). Further, the diffusion curve generation system 102 directly obtains the colors of the vector graphic image as one of the parameters or the diffusion curve generation system 102 interpolates the colors in the vector graphic image from the parameters (e.g., the diffusion handles).

As mentioned above, the diffusion curve 403 includes a set of diffusion handles (e.g., point handles) that define how color diffuses across an image. In particular, a diffusion handle (e.g., a point handle) has a particular position and color value within an image (e.g., the vector graphic image). Moreover, in some embodiments, the diffusion handles 404 make up a curve (e.g., a Bezier curve), such that the color values along the curve are defined to take different values on either side of the curve and vary along the length of the curve.

Furthermore, in some embodiments, the diffusion curve 403 includes a line segment made up of line handles. In particular, a line segment refers to a line segment made up of two handles (e.g., the line segment is defined by the positions of two endpoints in an image subdomain). Further, the line segment is defined by the colors on the left and the right side of the line at the two endpoints (e.g., handles). Moreover, the diffusion curve generation system 102 linearly interpolates colors between the endpoints.

As further shown in FIG. 4, the Monte Carlo PDE model 402 is parameterized by the diffusion handles 404 of the diffusion curve 403 which includes positions 405*a* of the diffusion handles and colors 405*b* of the diffusion handles. In one or more embodiments, the position of a diffusion handle refers to its location within the image domain (e.g., the two-dimensional scene rendered from the three-dimensional digital scene). Furthermore, the position of a diffusion handle dictates the area of influence the diffusion handle has on a color gradient in the vector graphic image.

In one or more embodiments, the color of a diffusion handle refers to a visual perception of light emitted or reflected from the diffusion handle. In particular, the color of the diffusion handle includes a hue (e.g., the color itself), a saturation (e.g., intensity of the color), and a brightness (e.g., the lightness or darkness). In particular, since the diffusion curve generation system 102 uses the diffusion curve 403 to generate a vector graphic image, the color value of the diffusion handle defines the color of geometric shapes (e.g., points, lines, curves, etc.) in the vector graphic image.

Further, FIG. 4 shows the diffusion curve generation system 102 comparing Monte Carlo PDE color estimates 407 (e.g., from the diffusion handles 404 of the diffusion curve 403) with Monte Carlo rendering color estimates 408 from the Monte Carlo rendering model 406. In particular, based on comparing the Monte Carlo rendering color estimates 408 with the Monte Carlo PDE color estimates 407, the diffusion curve generation system 102 generates a loss gradient estimate 412.

In one or more embodiments, the diffusion curve generation system 102 generates the loss gradient estimate 412, the loss gradient estimate refers to a representation of a rate of change of a loss function with respect to specific parameters. In particular, the diffusion curve generation system 102 generates the loss gradient estimate 412 by comparing the Monte Carlo rendering color estimates 408 (e.g., for the target image) with the Monte Carlo PDE color estimates 407 (e.g., for the reconstructed image).

In some embodiments, the diffusion curve generation system 102 uses an L2 reconstruction loss function for the comparison between the Monte Carlo rendering color estimates 408 and the Monte Carlo PDE color estimates 407. Specifically, a gradient of the L2 reconstruction loss function refers to a vector of partial derivatives of the loss function and provides a direction in which the function increases most rapidly (e.g., increases by a threshold amount). To illustrate, the loss gradient estimate 412 indicates how to modify parameters (e.g., the Monte Carlo PDE model 402 parameterized by the diffusion curve 403) to reduce the measure of loss between the Monte Carlo PDE color estimates 407 and the Monte Carlo rendering color estimates.

In one or more embodiments, the diffusion curve generation system 102 generates the loss gradient estimate 412 by taking a Jacobian of the loss (e.g., the difference between the reconstructed image and the target image) and further taking a second integral of the Jacobian of the loss. In one or more embodiments, the Jacobian of the loss refers to a matrix of first-order partial derivatives for a loss function. In particular, the Jacobian of the loss includes first order partial derivatives of each output function with respect to each input. In other words, the Jacobian of the loss describes how each output variable changes (e.g., the diffusion handles) with respect to changes in each input variable.

Further, in some embodiments, based on comparing the Monte Carlo PDE color estimates 407 and the Monte Carlo rendering color estimates 408, the diffusion curve generation system 102 also generates a loss Hessian estimate 414. In one or more embodiments, the diffusion curve generation system 102 generates the loss Hessian estimate 414 which refers to a matrix of second-order partial derivatives and describes how the loss gradient estimate 412 changes with respect to the diffusion curve 403 (e.g., the parameters of the Monte Carlo PDE model 402). In contrast with the loss gradient estimate 412 (which indicates the rate of change of the loss function), the loss Hessian estimate 414 describes the relationship between the diffusion handles 404 of the diffusion curve 403 and the loss gradient estimate 412.

In some embodiments, the diffusion curve generation system 102 uses a Gauss-Newton optimization model 410 to generate the loss Hessian estimate 414. In one or more embodiments, the Gauss-Newton optimization model 410 refers to a model that solves non-linear least squares problems when the objective is to minimize the sum of squared residuals between the target image and the reconstructed image. In particular, the diffusion curve generation system 102 uses the Gauss-Newton optimization model 410 to approximate the loss Hessian estimate 414 (e.g., a Hessian matrix).

For instance, rather than directly computing the full Hessian (e.g., which involves second-order derivatives), the Gauss-Newton optimization model 410 approximates the Hessian matrix using the Jacobian matrix (e.g., discussed above), which increases the speed of deriving the Hessian relative to existing methods. To illustrate, the diffusion curve generation system 102 uses a Levenberg-Marquardt method (e.g., an iterative optimization algorithm that is a blend between Gauss-Newton and gradient descent) with the Gauss-Newton optimization model 410 to decrease the residual at each iteration. Specifically, the Levenberg-Marquardt method adds a regularization term to ensure convergence.

To illustrate, the Levenberg-Marquardt method iterative adjusts a regularization term, where if a modification reduces a loss function, then the regularization term is decreased (e.g., moving the algorithm closer to the Gauss-Newton model) and if a modification fails to reduce the loss function, the regularization term is increased (e.g., shifting the algorithm towards a stable gradient descent approach). In one or more embodiments, the diffusion curve generation system 102 uses the Gauss-Newton optimization model 410 to generate the loss Hessian estimate 414, because performing second-order partial derivatives is computationally expensive.

From one or both (e.g., the loss gradient estimate 412 and/or the loss Hessian estimate 414), the diffusion curve generation system 102 further generates modified diffusion handles 416 relative to the diffusion handles 404 of the diffusion handle 404. As shown, the diffusion curve generation system 102 generates the modified diffusion handles 416 with modified positions 418 and modified colors 420. In some embodiments, the diffusion curve generation system 102 also generates the modified diffusion handles 416 with a reduced total number of diffusion handles relative to the diffusion curve (e.g., by performing an act 422 of removing a subset of handles from the diffusion curve 403).

As just mentioned, the diffusion curve generation system 102 removes a subset of diffusion handles from a plurality of diffusion handles of the diffusion curve 403 such that a modified diffusion curve has a reduced number of total diffusion handles relative to the diffusion curve 403. In particular, the diffusion curve generation system 102 removes a subset of diffusion handles based on a diffusion handle existence. In one or more embodiments, diffusion handle existence refers to a likelihood of a diffusion handle in a diffusion curve existing, with respect to minimizing a loss between a target image and a reconstructed image. In other words, the diffusion curve generation system 102 determines whether a diffusion handle should exist based on minimizing the loss function between the Monte Carlo rendering color estimates 408 and the Monte Carlo PDE color estimates 407.

FIG. 4 shows the Monte Carlo PDE model 402 as parameterized by the diffusion curve 403 with the diffusion handles 404. In one or more embodiments, the diffusion curve generation system 102 initially generates Monte Carlo rendering color estimates for corresponding subpoints of an image of a three-dimensional digital scene and then generates Monte Carlo PDE color estimates for corresponding subpositions within a target image of the three-dimensional digital scene. In other words, the diffusion curve generation system 102 initially determines the parameters of the Monte Carlo PDE model 402 from the arbitrarily queried Monte Carlo rendering color estimates and then iteratively optimizes the parameters (e.g., the initial diffusion curve), as shown in FIG. 4.

Thus, although FIG. 4 shows a diffusion curve 403 and a modified diffusion curve with the modified diffusion handles 416, in one or more embodiments, the diffusion curve generation system 102 utilizes an initial diffusion curve (e.g., the diffusion curve 403), utilizes multiple intermediate diffusion curves (not shown), and eventually ends up with a final diffusion curve (e.g., the modified diffusion handles 416).

Figure 5:
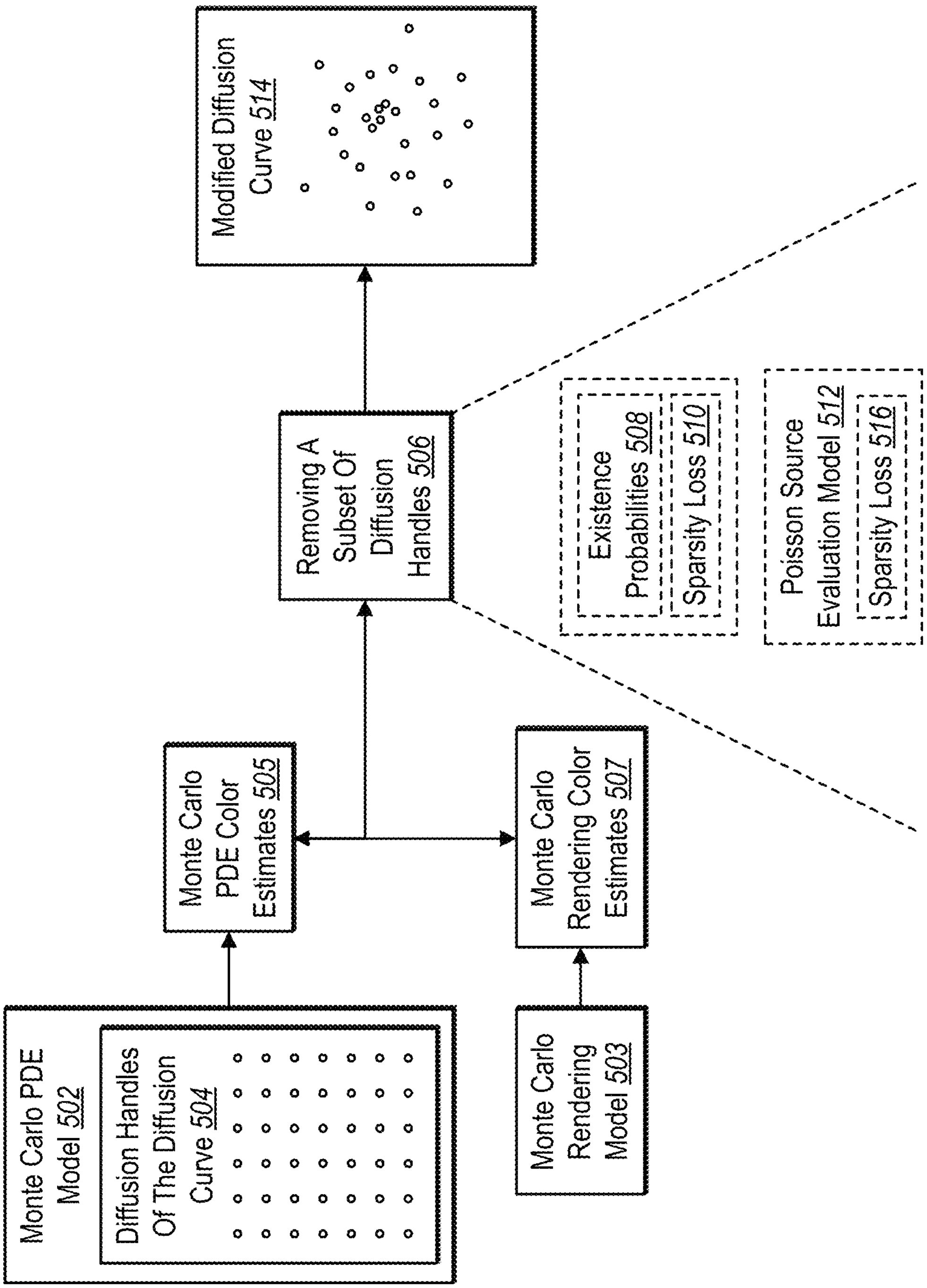
FIG. 5 illustrates an example diagrams of the diffusion curve generation system removing a subset of diffusion handles from a diffusion curve to arrive at a modified diffusion curve in accordance with one or more implementations.

As mentioned above, the diffusion curve generation system 102 removes a subset of diffusion handles from a diffusion curve to generate a modified diffusion curve. FIG. 5 illustrates the diffusion curve generation system 102 utilizing a variety of models to identify a subset of diffusion handles and to further remove the subset of diffusion handles.

As shown in FIG. 5, the diffusion curve generation system 102 utilizes a Monte Carlo PDE model 502 parameterized by diffusion handles of a diffusion curve 504 and a Monte Carlo rendering model 503. Specifically, as shown, the diffusion curve generation system 102 generates Monte Carlo PDE color estimates 505 from the Monte Carlo PDE model 502 and Monte Carlo rendering color estimates 507 from the Monte Carlo rendering model 503. Furthermore, as shown, the diffusion curve generation system 102 compares the Monte Carlo PDE color estimates 505 with the Monte Carlo rendering color estimates 507 to perform an act 506 of removing a subset of diffusion handles.

As shown in FIG. 5, the act 506 of removing a subset of diffusion handles includes the diffusion curve generation system 102 utilizing existence probabilities 508 (e.g., a product of a diffusion handle independently existing), sparsity loss 510, a Poisson source evaluation model 512 and/or sparsity loss 516. In particular, the diffusion curve generation system 102 performs the act 506 of removing a subset of diffusion handles based on optimizing for the existence of diffusion handles. In other words, the diffusion curve generation system 102 determines whether the existence of a diffusion handle contributes to reducing a measure of loss between the Monte Carlo PDE color estimates 505 and the Monte Carlo rendering color estimates 507.

In one or more embodiments, the diffusion curve generation system 102 optimizes for the existence of diffusion handles by reformulating a geometry optimization problem as a source term optimization for a screened Poisson equation. In particular, the diffusion curve generation system 102 uses the Poisson source evaluation model 512 to select a subset of diffusion handles to remove from a plurality of diffusion handles of the diffusion curve 504. For instance, the diffusion curve generation system 102 utilizes the Poisson source evaluation model 512 to represent the diffusion handles as a source term and optimizes them to obtain the handle geometries that includes the existence of diffusion handles without any Dirichlet boundaries (e.g., constraints used to specify the value of a function on the boundary of its domain).

In some embodiments, a source term refers to a specific function or value that represents the initial distribution or input driving a Walk on Stars simulation. For example, a source term in context of heat distribution problems, refers to a representation of an intensity of radiation emitted from a specific location. In context of the diffusion curve generation system 102, in some embodiments, the source term represents an intensity of color emitted from a specific location (e.g., a position of a diffusion handle).

To illustrate, the diffusion curve generation system 102 uses the Poisson source evaluation model 512 to represent a diffusion handle using a source term (e.g., a Dirac delta function), which weights diffusion handles by modeling gradients with respect to diffusion handle existence.

In one or more embodiments, a weight for a diffusion handle refers to a cost or an expense of a diffusion handle with respect to the diffusion handle's existence. In particular, the diffusion curve generation system 102 optimizes for the existence of a diffusion handle, and if the existence of a diffusion handle is a non-zero value, the diffusion curve generation system 102 assigns a weight to the diffusion handle at a certain position that indicates its likelihood of existence. Additional details of the Poisson source evaluation model 512 is given below in the description of FIG. 6.

As also shown in FIG. 5, the diffusion curve generation system 102 utilizes the sparsity loss 516 with the Poisson source evaluation model 512. In some embodiments, as the optimization process progresses, the diffusion curve generation system 102 utilizes the sparsity loss 516 to push the existence of a diffusion handle to zero and eliminates/removes the diffusion handle. In particular, the diffusion curve generation system 102 uses a sparsity loss to add a small sparsity loss to diffusion handles. For instance, when the weight of a diffusion handle falls below a certain threshold, the diffusion curve generation system 102 eliminates/removes the diffusion handle from the plurality of diffusion handles. To illustrate, the diffusion curve generation system 102 uses the sparsity loss 516 to sparsify (e.g., reduce) the set of diffusion handles of the diffusion curve 504.

In other words, as the diffusion curve generation system 102 reduces the measure of loss between the Monte Carlo rendering model 503 and the Monte Carlo PDE model 502 (e.g., by comparing color estimates). Furthermore, the diffusion curve generation system 102 modifies weights associated with the diffusion handles to indicate a likelihood of existence of the diffusion handles. Thus, the diffusion curve generation system 102 utilizes the Poisson source evaluation model 512 (e.g., with the sparsity loss 516) to identify a subset of diffusion handles to remove based on treating diffusion handles as a source term and further weighting the diffusion handles with respect to their likelihood of existing.

In addition, FIG. 5 shows in some embodiments, that the diffusion curve generation system 102 utilizes the existence probabilities 508 to perform the act 506 of removing a subset of diffusion handles. In one or more embodiments, an existence probability refers to the diffusion curve generation system 102 associating a diffusion handle with a probability of existing. In particular, the diffusion curve generation system 102 uses a Walk on Stars method which simulates Brownian motion, and when the simulation bumps into a diffusion handle (e.g., a boundary), the diffusion curve generation system 102 determines whether to accept the diffusion handle (e.g., boundary condition) or to ignore the diffusion handle and continue walking.

Moreover, the diffusion curve generation system 102 uses the Walk on Stars method to obtain a probability value for the diffusion handle (e.g., based on accepting or ignoring the condition) and further averages the results of diffusion handle existence versus the diffusion handle not existing (e.g., the averaged value is a weight for the diffusion handle). To illustrate, the diffusion curve generation system 102 determines the existence probabilities 508 to determine how much a diffusion handle affects the solution of minimizing a loss between a target image and a reconstructed image.

Furthermore, FIG. 5 shows the diffusion curve generation system 102 further utilizing the sparsity loss 510 in combination with the existence probabilities 508. Similar to the discussion above, as the optimization process progresses, the diffusion curve generation system 102 utilizes the sparsity loss 510 to push the existence of a diffusion handle to zero and eliminates/removes the diffusion handle.

Thus, as shown, the diffusion curve generation system 102 utilizes the existence probabilities 508 or the Poisson source evaluation model 512 to generate a modified diffusion curve 514. In particular, based on utilizing one of the aforementioned models, the diffusion curve generation system 102 removes a subset of diffusion handles form the diffusion curve 504 to optimize the number of diffusion handles. Further, the diffusion curve generation system 102 more effectively and accurately generates a vector graphic image from the modified diffusion curve 514.

Figure 6:
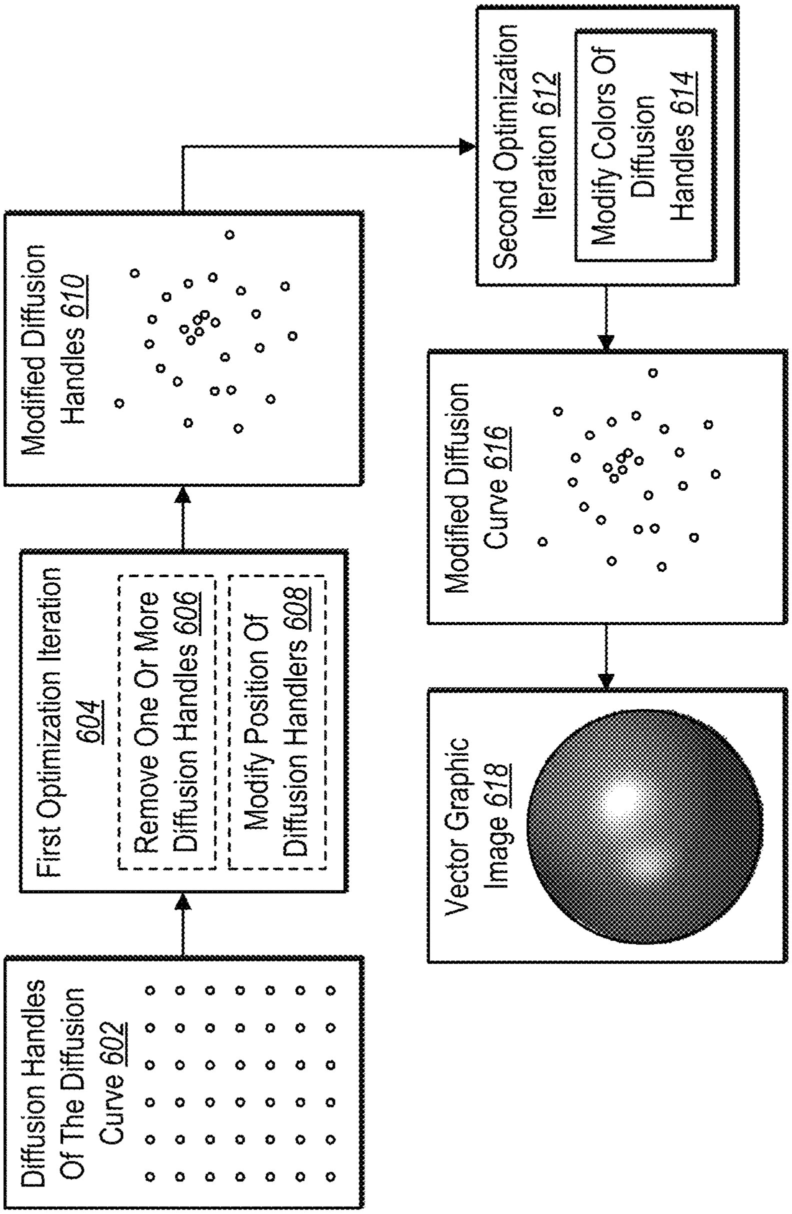
FIG. 6 illustrates an example diagram of the diffusion curve generation system performing a first optimization iteration and a second optimization iteration to generate a vector graphic image from a modified diffusion curve in accordance with one or more implementations.

FIG. 6 illustrates a more detailed overview diagram of the diffusion curve generation system 102 performing a first optimization iteration (e.g., to optimize geometry) and a second optimization iteration (e.g., to optimize colors) to generate a vector graphic image from a modified diffusion curve in accordance with one or more embodiments.

In one or more embodiments, the diffusion curve generation system 102 estimates a vector graphic image 618 by dividing a diffusion curve generation problem into two steps, 1) the computation of handle geometry (e.g., location and existence) and 2) the assignment of handle colors. To illustrate, the diffusion curve generation system 102 directly uses Monte Carlo rendering color estimates (e.g., Monte Carlo samples) as input without needing to produce a converged error-free target image beforehand. For instance, the diffusion curve generation system 102 starts an optimization process with many unstructured points and line handles and prunes down the diffusion handles as the optimization progresses.

As mentioned, in one or more embodiments, the diffusion curve generation system 102 accesses a target image which has a finite domain $A \subset \mathbb{R}^2$ with an infinite resolution. In particular, the diffusion curve generation system 102 models the target image $I_t(x)$ that has three color channels (e.g., $I_t(x) \in \mathbb{R}^3$), and the target image $I_t(x)$ for $x \in A$ is represented with random Monte Carlo samples $\hat{I}_t(x)$ that the diffusion curve generation system 102 queries at any arbitrary point x within the image domain, with the property that $E[\hat{I}_t(x)] = I_t(x)$, where E[•] denotes an expectation or an expected value of a random variable if the optimization process is repeated a number of times under certain conditions.

As discussed above in FIG. 3, in some embodiments, the diffusion curve generation system 102 associates each Monte Carlo rendering color estimate with a deterministic object identifier. In particular, to determine such an object identifier, the diffusion curve generation system 102 casts a ray from a camera viewpoint and checks which object/primitive (e.g., geometric element) the ray hits in the input three-dimensional digital scene. In one or more embodiments, the diffusion curve generation system 102 uses the object identifier information to simplify a problem of optimization by handling sharp color discontinuities identified by the object identifier discontinuities.

As also discussed above in FIG. 3, in some embodiments, the diffusion curve generation system 102 uses each object identifier to find an image subdomain by projecting the object or primitive onto a two-dimensional image plane. In particular, rather than considering a global problem in A (e.g., the finite domain of the target image), the diffusion curve generation system 102 solves the optimization problem in each subdomain ($\Omega_i \subset R^2$), where each subdomain contains the parts of the projected geometry that are not visible form the camera and the parts that are not included in A (e.g., the finite domain of the target image).

Moreover, as discussed in FIG. 5, in each subdomain, the diffusion curve generation system 102 finds sparse diffusion curve handles (e.g., diffusion handles (such as point handles) and line handles, where line handles are a type of diffusion handle) that minimize a reconstruction loss (e.g., minimize a difference between Monte Carlo PDE color estimates and Monte Carlo rendering color estimates). In particular, each line handle is represented using the positions of two endpoints in an image domain, together with the colors on the left and the right sides of the line segment at the two endpoints in an image subdomain $\Omega_i$. Further, for a line segment, the diffusion curve generation system 102 linearly interpolates the colors between the endpoints.

The following description provides context for the geometry optimization problem performed by the diffusion curve generation system 102. In some embodiments, given a set of colored handles placed in the image space sub-domain, the diffusion curve generation system 102 diffuses colors from the handles to the rest of the image to define the image in the continuous image space. Formally, given handles parameterized with parameters θ, the diffusion curve generation system 102 defines a reconstructed image I(x; θ) to be the solution u(x) of the Laplace equation, $$\Delta u(x) = 0 \text{ for } x \in \Omega \backslash H(\theta) \tag{1}$$

Where H(θ) is the set of all diffusion handles and I(x; θ) (the reconstructed image) and u(x) are used interchangeably. In the description, I(x; θ) is used to emphasize the parameter dependence of the reconstructed image.

In some embodiments, at the diffusion handles, there are Dirichlet boundary conditions which are represented as, $$u(x) = c(x; 0) \text{ for } x \in H(\theta) \tag{2}$$

where the color c(x;θ) is given directly as one of the parameters or, or the color depends on interpolation of the parameters. In some embodiments, the diffusion curve handles are specified as curves (e.g., Bezier curves) in which case the color is defined to take different values on either side of the curve and to vary along the length of the curve. As mentioned above, the diffusion curve includes diffusion handles (e.g., point handles) and line segments.

Furthermore, domain boundaries without diffusion handles are treated with the Neumann condition, which is represented as, $$\frac{\partial u}{\partial n}(x) = 0 \text{ for } x \in \partial\Omega \backslash H(\theta) \tag{3}$$

where the normal vector n points outwards from the domain. In some embodiments, because images reconstructed in the manner shown above in equation 3 exhibit sharp color discontinuities or peaks at handle positions, the diffusion curve generation system 102 additionally computes a Gaussian smoothing filter size to apply over the image by solving another Laplace equation, which is described in Alexandrina Orzan, Adrien Bousseau, Holger Winnemoller, Pascal Barla, Joelle Thollot, and David Salesin, 2008, *Diffusion curves: a vector representation for smooth-shaded images*, In ACM SIGGRAPH 2008 Papers (Los Angeles, California) (SIGGRAPH '08), Association for computing Machinery, New York, NY, USA, Article 92, 8 pages.

In one or more embodiments, the diffusion curve generation system 102 solves diffusion curve related problems using the Laplace equation shown above as equation 1. In addition, in some embodiments, the diffusion curve generation system 102 formulates the problem as a screened Poisson problem (e.g., the Poisson source evaluation model discussed above in FIG. 5) and considers the application of Walk on Stars to the screened Poisson equation, which is represented as, $$(\Delta - \sigma)u(x) = f(x; \theta) \text{ for } x \in \Omega \backslash H(\theta) \tag{4}$$

where σ is a constant screening parameter and f(x;θ) is a parameter-dependent source term.

Further in some embodiments, the diffusion curve generation system 102 retains the previously introduced mixed boundary conditions (equation 2 and 3 shown above) and the Laplace equation (equation 1) is treated as a special case of the screened Poisson equation (e.g., equation 4). In some embodiments, the diffusion curve generation system 102 uses the Monte Carlo PDE model as a walk on stars estimator which is based on an integral equation defined inside a star-shaped domain around a current point x. In particular, a star-shaped domain St is defined as an intersection of the image domain Ω and the ball $B_R(x)$ centered at x with radius $R{:}St(x)=\Omega\cap B_R(x)$.

In some embodiments, the diffusion curve generation system 102 samples the radius R to be the largest value such that the nearest Dirichlet boundary point from x is not inside the ball and any ray cast from x does not intersect two or more Neumann boundary points (e.g., the diffusion curve generation system 102 ignores the latter condition when the domain bounded by the Neumann boundary is convex).

In one or more embodiments, under the assumption that all the Neumann boundaries are zero Neumann boundaries (e.g., equation 3), the integral equation for Walk on Stars is represented as, $$\alpha(x)u(x)=\int_{\partial St}u(z)\frac{\partial G_R^{\sigma}(x,z)}{\partial n_z}dz+\int_{St(x)}f(y;\theta)G_R^{\sigma}(x,y)dy \tag{5}$$

In particular, $$G_R^{\sigma}(x,z)$$

is the Green's function for the screened Poisson equation with zero Dirichlet boundaries on the ball with radius R, and $$n_z=\frac{z-x}{\|z-x\|}$$

is the interior angle divided by 2π. For example, α(x)=1 for $x\in\Omega/H(\theta)$ and α(x)=0.5 for x on a smooth Neumann boundary.

Furthermore, in a two-dimensional image domain, assuming that x lies at the center of the ball, the diffusion curve generation system 102 represents this as, $$G_R^{\sigma}(x,y)=-\frac{1}{2\pi}\log\frac{r}{R}\quad\frac{\partial G_R^{\sigma}(x,y)}{\partial n_y}=\frac{1}{2\pi}\frac{n_y\cdot(y-x)}{r^2} \tag{6}$$

where σ=0 and when σ≠0, $$G_R^{\sigma}(x,y)=\frac{1}{2\pi}\left\{K_0(r\sqrt{\sigma})-I_0(r\sqrt{\sigma})\frac{K_0(R\sqrt{\sigma})}{I_0(R\sqrt{\sigma})}\right\},\text{ and} \tag{7}$$

$$\frac{\partial G_R^{\sigma}(x,y)}{\partial n_y}=Q_R^{\sigma}(x,y)\frac{\partial G_R^{0}(x,y)}{\partial n_y}\text{ where}$$

$$Q_R^{\sigma}(x,y)=\left\{K_1(r\sqrt{\sigma})+I_1(r\sqrt{\sigma})\frac{K_0(R\sqrt{\sigma})}{I_0(R\sqrt{\sigma})}\right\}r\sqrt{\sigma}\text{ and }r=\|y-x\|_2.$$

Moreover, in some embodiments, the diffusion curve generation system 102 defines equations 6 and 7 to have a value of zero when y is outside the ball.

In equation 5 above, the first integral is over the boundary of the star shape, and the second integral is over the domain bounded by the star shape. In some embodiments, the diffusion curve generation system 102 utilizes Walk on Stars to estimate both integrals with a one-point Monte Carlo estimate. In particular, the diffusion curve generation system 102 estimates the first term by casting a ray from x in a uniformly sampled direction and samples the intersection point z on the boundary of the star shape. Furthermore, the probability density function of the sampling strategy is $$\frac{1}{\alpha}\frac{\partial G_R^0}{\partial_n}.$$

Moreover, in some embodiments, the diffusion curve generation system 102 estimates the second integral using an appropriate importance sampling technique with probability p(y|x). In particular, a current point x is within a distance ϵ from a Dirichlet boundary, and the diffusion curve generation system 102 assumes that the solution coincides with a given boundary value at the nearest Dirichlet boundary point x* and terminates the walk.

Further, in some embodiments where σ>0 and the diffusion curve generation system 102 has $$0<Q_R^{\sigma}(x,z)<1,$$

the diffusion curve generation system 102 uses a Russian roulette probability for early path termination (e.g., a probability of a light ray/particle being terminated after it has traveled a certain distance or undergone a certain number of interactions in the image domain). In particular, the diffusion curve generation system 102 summarizes the Walk on Stars estimator as, $$\hat{u}(x)=\begin{cases}c(x^*;\theta) & \text{if } \|x-x^*\|<\varepsilon,\\ \hat{u}(z)+\dfrac{f(y;\theta)G_R^{\sigma}(x,y)}{\alpha(x)p(y\mid x)} & \text{if } \|x-x^*\|\geq\varepsilon\text{ and } s<Q_R^{\sigma}(x,z)\\ \dfrac{f(y;\theta)G_R^{\sigma}(x,y)}{\alpha(x)p(y\mid x)} & \text{otherwise,}\end{cases} \tag{8}$$

where the hat notation indicates a Monte Carlo estimate, and x*ϵH(θ) is the closest Dirichlet boundary point from x. Further, z is the point inside the domain bounded by the star shape sampled with probability density p(y|x) and s is a uniformly random sample from [0,1]. Moreover, the diffusion curve generation system 102 takes an average of many such estimates to obtain a converging estimate to the true solution u(x) up to some bias introduced by the ε-shell path termination strategy.

Additionally, as discussed above in FIG. 5, the diffusion curve generation system 102 considers an inverse PDE problem of finding diffusion handles (e.g., existence of diffusion handles). In some embodiments, in addition to the solution u to equation 4, solving inverse problems also requires estimating the Jacobian of u with respect to the diffusion handle parameters, $$\frac{\partial u}{\partial\theta}.$$

For instance, the diffusion curve generation system 102 assumes a source term f and Dirichlet boundary data (e.g., the handle colors c and the handle positions H), are parameter dependent.

Furthermore, the diffusion curve generation system 102 finds the Jacobian (e.g., discussed above in FIG. 2) by solving another screened Poisson equation represented as, $$(\Delta - \sigma)\left[\frac{\partial n}{\partial \theta}\right](x) = \frac{\partial f}{\partial \theta}(x) \text{ for } x \in \Omega \backslash H(\theta) \tag{9}$$

$$\left[\frac{\partial n}{\partial \theta}\right](x) = \frac{\partial f}{\partial \theta}(x; \theta) - \left\{n(x) \cdot \frac{\partial x}{\partial \theta}\right\}\frac{\partial n}{\partial n}(x) \text{ for } x \in H(\theta)$$

$$\frac{\partial}{\partial n}\left[\frac{\partial n}{\partial \theta}\right](x) = 0 \text{ for } x \in x \in \partial\Omega \backslash H(\theta)$$

where n is the normal vector pointing outwards from the domain toward the diffusion handle. In some embodiments, in dealing with diffusion handles (e.g., including line handles), the normal direction is the direction from which a walk reaches the diffusion handle. In particular, equation 9 is another screened Poisson equation, and the diffusion curve generation system 102 utilizes the Walk on Stars estimator to estimate the Jacobian. In equation 9 however, the Dirichlet boundary condition for $x \in H(\theta)$ depends on the normal derivative $$\frac{\partial u}{\partial \theta}(x)$$

of the solution when the handle position $x \in H(\theta)$ depends on parameters. Therefore, when the Walk on Stars walk reaches a Dirichlet boundary, the diffusion curve generation system 102 estimates a normal derivative of the original Poisson equation's solution from there.

As shown above, the diffusion curve generation system 102 accounts for the solution of the equation (e.g., the solution of the Jacobian) with respect to the boundary values and boundary geometry as discussed above in FIG. 5 with respect to the existence probabilities. Furthermore, the diffusion curve generation system 102 also accounts for the optimization of the same solution with respect to an error measure. In some embodiments, the diffusion curve generation system 102 deals with the existence of the diffusion handles (e.g., Dirichlet handle conditions) by pruning boundaries that do not sufficiently contribute to decreasing a reconstruction error loss, to produce a sparse set of handles to represent a target image.

In one or more of the equations shown above, the presence or absence of diffusion handles is a binary variable and therefore cannot be continuously optimized. In order to continuously optimize the presence/absence of boundaries, the diffusion curve generation system 102 defines a continuous relaxation of the notion of the existence of a boundary, models the existence of the boundary in a solver, and derives the gradients with respect to a new continuous variable. In particular, the diffusion curve generation system 102 rigorously handles partially present boundaries, as the existence and geometry of the boundaries are relied on to determine the steps in the walk of a Walk on Stars algorithm, and while geometry is differential, the existence is not.

In other words, the diffusion curve generation system 102 handles the presence or absence of boundaries (e.g., diffusion handles) heuristically by stochastically disabling certain boundaries during a walk with an optimizable probability. To mitigate against the complexity and cost of such a solution, the diffusion curve generation system 102 transforms the problem such that the Dirichlet boundaries (e.g., the diffusion handles) are part of a source term, which allows for efficiently optimizing their strength in the image domain. This is described in more detail below.

In one or more embodiments, the diffusion curve generation system 102 formulates the task as an optimization problem to find parameters (e.g., the diffusion handles). In particular, the diffusion curve generation system 102 initially places the diffusion handles (e.g., point handles and line handles) on the image space by assigning them positions based on samples from a quasi-random number sequence as described in Stephen Joe and Frances Y. Kuo, 2008, *Constructing Sobol Sequences with Better Two-Dimensional Projections*, SIAM J. Sci, Comput. 3-, 5 (August 2008), 2635-2654. In one or more embodiments, when a line handle is involved, the initial length of the line handle is set to one tenth of the image width. Further, the diffusion curve generation system 102 optimizes the handles to minimize the squared L2 reconstruction loss, $$L(\theta) = \frac{1}{2}\int_A \|I(x; \theta) - I_t(x)\|_2^2 dx \tag{10}$$

In one or more embodiments, the diffusion curve generation system 102 encourages diffusion curve handles to be pruned such that the handles become sparser as the optimization progresses (e.g., removes handles). In particular, to perform a gradient-based optimization with the squared L2 loss, the diffusion curve generation system 102 uses walk on stars Monte Carlo samples to estimate the $I(x; \theta)$ and $$\frac{\partial I}{\partial \theta}(x; \theta)$$

within each subdomain $\Omega_i$.

FIG. 6 shows the diffusion curve generation system 102 accessing parameters of a Monte Carlo PDE model. Specifically, the parameters of the Monte Carlo PDE model include diffusion handles of a diffusion curve 602. Furthermore, FIG. 6 shows a first optimization iteration 604 that includes at least one of an act 606 (e.g., removing one or more diffusion handles from the diffusion curve 602) or an act 608 (e.g., modifying position of diffusion handles). In particular, FIG. 6 also shows the diffusion curve generation system 102 generating modified diffusion handles 610 from performing the first optimization iteration 604.

In one or more embodiments, optimizing the diffusion curve handles directly as Dirichlet boundaries is highly inefficient. In other words, the existence of the Dirichlet handles themselves do not sufficiently contribute to decreasing a reconstruction error loss to produce a sparse set of handles to represent the target image. In particular, the diffusion curve generation system 102 formulates a boundary optimization problem (e.g., optimizing for existence of handles) as a source term optimization for a screened Poisson equation.

In one or more embodiments, the diffusion curve generation system 102 solves a forward problem of reconstructing an image from diffusion handles using the Laplace equation (e.g., equation 1). In particular, by Dirichlet's principle, the diffusion curve generation system 102 finds the u that minimizes the Dirichlet energy, $$\int_\Omega \|\nabla u(x)\|_2^2 dx \tag{11}$$

In particular, when equation 11 is combined with the Dirichlet constraints at the diffusion handles shown in equation 2, the solution to this constrained optimization is a stationary point of the Lagrangian, which the diffusion curve generation system 102 represents as another energy, $$\int_{\Omega} \|\nabla u(x)\|_2^2 dx - \int_{\Omega} f(x) \cdot \{u(x) - c(x;\theta)\} dx \qquad (12)$$

Where the function f is a Lagrange multiplier function.

Further, in some embodiments, the diffusion curve generation system 102 defines f over all of an image subdomain by setting f to zero except on H, which allows the diffusion curve generation system 102 to represent the second term as an integral over the image subdomain, $$\int_{\Omega} \|\nabla u(x)\|_2^2 dx - \int_{\Omega} f(x) \cdot \{u(x) - c(x;\theta)\} dx \qquad (13)$$

Where a Dirac measure is folded into f to account for the change of the integral domain. Moreover, in some embodiments, for minimizing over u, the f(x)·c(x;θ) term in the second integral is omitted, $$\int_{\Omega} \|\nabla u(x)\|_2^2 - f(x) \cdot u(x) dx \qquad (14)$$

Thus, using Dirichlet's principle a second time, the diffusion curve generation system 102 minimizes the expression in equation 14, which is equivalent to solving the Poisson problem, $$\Delta u(x) = f(x) \qquad (15)$$

with f as a singular source term.

In one or more embodiments, the above formulation implies that instead of optimizing the handles as Dirichlet boundaries, the diffusion curve generation system 102 first represents the handles as the source term f and optimizes them to obtain the handle geometries, which includes the existence and the positions without any Dirichlet boundaries. Further, in some embodiments, the Poisson equation is ill-posed when the compatibility condition with the Neumann boundary condition as expressed in equation 3 is not met, even if it is well-posed (e.g., the solution is not uniquely defined). Therefore, in some embodiments, the diffusion curve generation system 102 adds a small constant regularization term σ>0 to the Laplacian, yielding the screened Poisson problem as, $$(\Delta - \sigma) u(x) = f(x) \qquad (16)$$

In some embodiments, the diffusion curve generation system 102 optimizes the geometry by using a source term optimization formulation that implicitly considers the color information associated with each handle but encoded differently from the original color domain. Thus, the diffusion curve generation system 102 obtains a final result in a standard color format by performing color optimization as a separate step described below.

In one or more embodiments, the diffusion curve generation system 102 represents diffusion handles (e.g., point and line handles) using the source term and further modifies a Walk on Stars estimator accordingly. In particular, the diffusion curve generation system 102 represents a diffusion handle (e.g., a point handle) using a Dirac delta function, $$f(x;\theta) = w_p(\theta)\delta(x - x_p) \qquad (17)$$

Where $w_p(\theta)$ is the weight of the diffusion handle, and $x_p(\theta)$ is the position of the diffusion handle. In some embodiments, the diffusion curve generation system 102 solves the screened Poisson problem and finds the Jacobian with respect to parameters with the Walk on Stars method.

In some embodiments, the diffusion curve generation system 102 modifies the walk on stars algorithm (e.g., shown in equation 8) by directly sampling the Dirac delta source point contained inside the star shape of the current point at each step of the walk, which is represented as, $$\int_{St(x)} f(y;\theta) G_R^\sigma(x, y) dy = w_p(\theta) G_R^\sigma(x, x_p(\theta)) \approx w_p(\theta) \tilde{G}_R^\sigma(x, x_p(\theta)) \qquad (18)$$

Since $$G_R^\sigma$$

is singular at $x=x_p$, the diffusion curve generation system 102 replaces $$G_R^\sigma$$

with a regularized version $$\tilde{G}_R^\sigma$$

formed by replacing r with $$\sqrt{r^2 + \epsilon^2}.$$

Moreover, because the integrand is smooth with this regularization and because $$\tilde{G}_R^\sigma$$

is independent or the parameters, the diffusion curve generation system 102 formulates the problem as, $$\int_{St(x)} \frac{\partial f}{\partial \theta}(y;\theta) \tilde{G}_R^\sigma(x, y) dy = \frac{\partial}{\partial \theta} \int_{St(x)} f(y;\theta) \tilde{G}_R^\sigma(x, y) dy = \frac{\partial}{\partial \theta} \{w_p(\theta) \tilde{G}_R^\sigma(x, x_p(\theta))\} \qquad (19)$$

For which the diffusion curve generation system 102 utilizes to estimate the Jacobian $$\frac{\partial u}{\partial \theta}$$

when using differential Walk on Stars.

As mentioned above, the diffusion handles also include line handles. In some embodiments, line handles are an important element of diffusion curves because line handles represent color discontinuities in a target image by having different colors on each of the line handle's two sides. In particular, the diffusion curve generation system 102 also uses source term representation to support line handles with color discontinuities. For instance, the diffusion curve generation system 102 utilizes the methods described in Jasper van de Gronde, 2010, *A High Quality Solver for Diffusion Curves*, Master's thesis, University of Groningen, to handle discontinuity in a boundary integral framework.

In some embodiments, the diffusion curve generation system 102 considers a line handle to have two types of influence on a solution, a continuous contribution (e.g., influences the solution in the same way across the line) and a discontinuous contribution (e.g., smoothed discontinuity in the solution). In particular, a line handle has single-sided colors and needs only a first type of contribution. If the line handle has double-sided colors, the diffusion curve generation system 102 needs the second contribution (e.g., discontinuous contribution).

In some embodiments, the diffusion curve generation system 102 expresses the source term using Dirac deltas placed continuously along a line segment I(θ) for a continuous contribution. In particular, the diffusion curve generation system 102 represents the continuous contribution as, $$\int_{St(x)} f(y;\theta)G_R^{\sigma}(x,y)dy \approx \int_{l(\theta)} w_c(y;\theta)\tilde{G}_R^{\sigma}(x,y)dy \tag{20}$$

In some embodiments, the diffusion curve generation system 102 expresses the source term using normal derivatives of the Dirac delta placed continuously along the line segment for a discontinuous contribution. In particular, the diffusion curve generation system 102 represents the discontinuous contribution as, $$\int_{St(x)} f(y;\theta)G_R^{\sigma}(x,y)dy \approx \int_{l(\theta)} w_d(y;\theta)n(\theta)\cdot\nabla_y\tilde{G}_R^{\sigma}(x,y)dy \tag{21}$$

Where n is the normal direction of the line segment. In particular, the weights $w_c(y;\theta)$ and $w_d(y;\theta)$ are linearly interpolated between the two endpoints.

In some embodiments, the diffusion curve generation system 102 samples points randomly and uniformly on a line segment to produce an estimate of equations 20 and 21 shown above. In particular, the diffusion curve generation system 102 chooses a number of samples to be proportional to the length of the line segment and when the line segment is shorter than a threshold length, the diffusion curve generation system 102 chooses at least one sample. Further, similar to point handles, the diffusion curve generation system 102 differentiates the right-hand side of equation 20 and equation 21 to compute the Jacobian.

Additionally, the diffusion curve generation system 102 considers the discontinuous contribution of the line handle, which results in desirable smoothing for optimization, as the diffusion curve generation system 102 does not need to perform explicit discontinuity sampling with this regularization. In particular, for smoothing, the diffusion curve generation system 102 utilizes a larger ε for the discontinuous term.

In one or more embodiments, the diffusion curve generation system 102 utilizes the Monte Carlo estimators for the solution and the Jacobian and performs an optimization. In particular, as the number of parameters in the optimization problem is small and because the primary loss is minimizing the least squared L2 loss (e.g., equation 10), the diffusion curve generation system 102 applies the Levenberg-Marquardt method as described in Jorge Nocedal and Stephn J. Wright, 2006, *Numerical optimization* ($2^{nd}$ ed. Ed.), Springer, New York, instead of a stochastic gradient descent.

In some embodiments, the diffusion curve generation system 102 derives an iteration of the Levenberg-Marquardt method by approximating I(x;θ) with up to the linear term in a Taylor expansion around θ and letting the normal equations $$\frac{\partial L}{\partial \theta} = 0.$$

In particular, given the current parameters $\theta_i$, the update rule to obtain $\theta_{i+1}$ is expressed as, $$\theta_{i+1} = \theta_i - \left\{\lambda I + \int_A J_i^T(x)J_i(x)dx\right\}^{-1}\int_A J_i^T(x)\{I(x;\theta_i) - I_t(x)\}dx \tag{22}$$

Where the image Jacobian $$J_i(x) = \frac{\partial L}{\partial \theta}(x;\theta),$$

I is an identity matrix, and λ is a nonnegative damping parameter. Specifically, the diffusion curve generation system 102 uses the update rule as an approximation to Newton's method's iteration using only first-order information. In the above equation, the first integral is an approximation to the Hessian $$\int_A \frac{\partial^2 I}{\partial \theta^2}dx$$

in Newton's method, and the second integral is the Jacobian of the loss with respect to the parameters. Further, the damping term λI is added to stabilize the method.

In some embodiments, the standard Levenberg-Marquardt method typically updates λ over iterations heuristically. In contrast, the diffusion curve generation system 102 uses a constant λ throughout the optimization process as heuristic iterative updates causes issues with method convergence. Moreover, as the approximate Hessian is analytically positive definite, the diffusion curve generation system 102 uses a Cholesky factorization to update the parameters which are updated iteratively until convergence.

In one or more embodiments, the diffusion curve generation system 102 estimates the above two integrals with Monte Carlo integration. In particular, the diffusion curve generation system 102 samples N points in A according to a probability density function p(x) to estimate the two integrals in equation 22, which is represented as, $$\int_A J_i^T(x) J_i(x) dx \approx \frac{1}{N} \sum_{j=1}^{N} \frac{J_i^T(x_j) J_i(x_j)}{p(x_j)} \tag{23}$$

$$\int_A J_i^T(x_j)\{I(x;\theta_i) - I_t(x)\} dx \approx \frac{1}{N} \sum\nolimits_{j=1}^{N} \frac{J_i^T(x_j)\{I(x_j;\theta_i) - I_t(x_j)\}}{p(x_j)}, \tag{24}$$

As the diffusion curve generation system 102 has access to random Monte Carlo samples with noise $\hat{I}(x;\theta_i)$, $\hat{J}_i(x)$, and $\hat{I}_t(x)$, the diffusion curve generation system 102 uses the Monte Carlo samples with noise to estimate $I(x;\theta_i)$, $J_i(x)$, and $I_t(x)$. Therefore, the products in equation 23 and equation 24 are further estimated with Monte Carlo in a nested manner.

In some embodiments, the diffusion curve generation system 102 assumes the position argument is $x_j$ and the parameter argument is $\theta_i$ and drops the position argument and parameter argument for the below notation for simplicity. In particular, the diffusion curve generation system 102 considers a situation with $N_U$ independent samples for each of $\hat{I}$ and $$\hat{J}_i^k$$

for $k \in \{1, \ldots, N_U\}$, and at least one sample of $\hat{I}_t$. Further, the diffusion curve generation system 102 generates the samples $\hat{I}^k$ and $$\hat{J}_i^k$$

using the same walk, thus they are correlated.

In some embodiments, the diffusion curve generation system 102 estimates an expectation of a product of two random variables in equation 23 and equation 24, which differs from the product of two expectations, unless the two random variables are statistically independent. As such, the diffusion curve generation system 102 uses independent samples to obtain an unbiased estimate of the product. In some embodiments, the diffusion curve generation system 102 uses a first approach to estimate equation 23 and a second approach to estimate equation 24.

In some embodiments, the diffusion curve generation system 102 estimates the Jacobian term (e.g., equation 24) by using a U-static estimator to get an unbiased estimate as described in Markus Kettunen, Eugene D'Eon, Jacopo Pantaleoni, and Jan Novak, 2021, *an unbiased ray-marching transmittance estimator*, ACM Trans. Graph, 40, 4, Article 137 (July 2021), 20 pages; A. J. Lee, 1990, *U-Statics: Theory and Practice*, Routledge; and Bailey Miller, Rohan Sawhney, Kennan Crane, and Ioannis Gkioulekas, 2024, *Differential Walk on Spheres*, ACM Trans. Graph 43, 6, Article 174 (November 2024), 18 pages.

In some embodiments, the diffusion curve generation system 102 uses the U-static estimator to increase the effective number of samples at each evaluation point $x_j$ by using all statistically independent pairs of samples represented as, $$J_i^T I \approx \frac{1}{N_U(N_U-1)} \sum\nolimits_{m=1}^{N_U} \sum\nolimits_{n=I}^{N_U} (\hat{J}_i^m)^T \hat{I}^n.$$

In some embodiments, for the Hessian term (e.g., equation 23), the diffusion curve generation system 102 uses all samples pairs to get a biased estimate represented as, $$J_i^T J_i \approx \frac{1}{N_U^2} \sum\nolimits_{m=1}^{N_U} \sum\nolimits_{n=1}^{N_U} (\hat{J}_i^m)^T \hat{J}_i^n.$$

Where the analytical value of the integral yields a positive semidefinite matrix by construction. In some embodiments, using the U-static estimator with a low sample count yields an indefinite matrix in its place, ruining the optimization. In contrast, using correlated pairs along with independent pairs guarantees that the estimated matrix is always positive semi-definite at the cost of additional bias. In some embodiments, equation 23 approximates the analytical Hessian from the start, and having the additional bias is justifiable.

In some embodiments, in addition to the primary reconstruction loss (e.g., equation 10), the diffusion curve generation system 102 adds a few regularization losses to sparsify (e.g., reduce) the set of diffusion curve handles as discussed in FIG. 5. In particular, for the regularization loss terms, the diffusion curve generation system 102 adds their analytical Hessians and gradients to the first and second integrals in equation 10, which computes an approximated Hessian and gradient of the squared L2 loss and performs optimization.

In some embodiments, for each point and line handle's weight, the diffusion curve generation system 102 adds a small sparsity loss (e.g., discussed in FIG. 5) defined as, $$L_{sparsity}(w) = \|w\|_2 \tag{25}$$

Where w corresponds to $w_p$ for a point handle, and to the values $w_c$ and $w_d$ stored at the two endpoints for line handles. In particular, for a point handle, the diffusion curve generation system 102 eliminates the point handle during optimization when $\|w_p\|_2$ falls below a certain threshold. Further, for a line handle, the diffusion curve generation system 102 eliminates the line handle when the norms of all its weights fall below a threshold.

In some embodiments, during optimization, line handles that become too long lead to an associated gradient that is too large compared to the scale of other gradients (e.g., also long line handles are undesirable in a final result). Further, the diffusion curve generation system 102 adds a line handle length regularization term to the original loss, represented as, $$L_{length}(x_1, x_2) = \begin{cases} \|x_1 - x_2\|_2 & \text{if } \|x_1 - x_2\|_2 > d \\ 0 & \text{otherwise} \end{cases}, \tag{26}$$

Where $x_1$ and $x_2$ are the two endpoints of the line handle. Specifically, the additional regularization term encourages the shortening of line handles of length greater than d.

In some embodiments, the diffusion curve generation system 102 encourages different line handles' endpoints to be close to each other as to better approximate continuous boundaries. In particular, when two endpoints of two different line segments are closer than a certain threshold distance (e.g., Euclidean distance), the diffusion curve generation system 102 decides whether to encourage the two endpoints of different line segments to coalesce based on two factors 1) the Euclidean distance between the endpoints and 2) the directional similarity of the segments, which is computed using the dot product of the line directions.

Further, in some embodiments, the diffusion curve generation system 102 defines a snapping score as a weighted average of the above two factors. In particular, when a pair of endpoints gives a mutually smallest napping score, the diffusion curve generation system 102 adds a regularization loss defined as the Euclidean distance between the endpoints, effectively encouraging them to snap. In some embodiments, the diffusion curve generation system 102 post processes snapped edges and merges them into continuous polylines or Bezier curves for subsequent user editing.

As further shown in FIG. 6, the diffusion curve generation system 102 further performs a second optimization iteration 612 to perform an act 614 of modifying colors of the diffusion handles (e.g., the modified diffusion handles 610. In doing the second optimization iteration 612, the diffusion curve generation system 102 generates a modified diffusion curve 616 and subsequently infers a vector graphic image 618 from the modified diffusion curve 616.

As described above, the diffusion curve generation system 102 obtains a sparse set of handles (e.g., optimizes for position and existence of diffusion handles). Further, the diffusion curve generation system 102 treats the positions of the handles as fixed Dirichlet boundaries. In other words, the second optimization iteration 612 involves the diffusion curve generation system 102 optimizing only the colors of the diffusion handles, and no secondary walks are necessary to estimate normal derivatives or account for existence probabilities.

In some embodiments, the diffusion curve generation system 102 modifies the Walk on Stars estimator (e.g., equation 8, which associates each sample with the boundary value of a single Dirichlet boundary point) by considering the direct illumination only when the light source is sampled according to BRDF sampling (e.g., bidirectional reflectance distribution function to simulate how light interacts with surfaces). In particular, the next event estimation (NEE) technique (e.g., which additionally samples the light source directly, has been shown to reduce the variance of Monte Carlo rendering) is combined with the Walk on Stars method. As discussed above, in Walk on Stars, the diffusion curve generation system 102 chooses the radius of the ball by querying the closest Dirichlet boundary point. By querying the closest Dirichlet boundary point, the diffusion curve generation system 102 constructs the star-shaped domain and samples one point on the boundary of the star shape to produce a one-point estimate of the boundary integral term until the sample point falls within an ε-shell of the Dirichlet boundary.

In the NEE technique combined with Walk on Stars, the diffusion curve generation system 102 examines the intersection between the boundary of the star-shaped domain ∂St(x) and the ball centered at x* with radius ε. In particular, when the Dirichlet boundaries are sufficiently far from any Neumann boundary, with a separation of at least ε, this intersection forms an arc. Moreover, during the walking process, the diffusion curve generation system 102 approximates the solution as u(x*) along this arc and directly samples contributions from this arc. For the solution estimate, the NEE technique with Walk on Stars replaces equation 8 with, $$\hat{u}(x) = \frac{\phi}{2\pi} c(x^*;\theta) + \frac{f(y;\theta)G(x,y)}{\alpha(x)p(y \mid x)} + \begin{cases} 0 & \|z - x^*\| < \epsilon \\ \hat{u}(z) & \text{otherwise} \end{cases} \tag{27}$$

Where ϕ is the central angle of the arc that is within distance ε from the closest Dirichlet boundary point x*, further represented as $$\phi = \begin{cases} 2a\cos\left(1 - 0.5\epsilon^2/\|x - x^*\|^2\right) & \text{if } \varepsilon < 2\|x - x^*\| \\ 2\pi & \text{otherwise} \end{cases} \tag{28}$$

In one or more embodiments, the NEE technique combined with Walk on Stars utilized by the diffusion curve generation system 102 obtains a different solution from the Walk on Stars method described in equation 8 because of how the solution is defined near Dirichlet boundaries. However, diffusion curve generation system 102 utilizing equation 28 or equation 8 converges to the same solution of ε→0. In particular, the diffusion curve generation system 102 utilizes the NEE technique with the Walk on Stars method to compute a solution and the gradient of the handle color parameters.

In one or more embodiments, the diffusion curve generation system 102 utilizes a second-order optimization method to optimize for color. In contrast to the geometry optimization discussed above, the color optimization for the reconstructed image I(x;$\theta_i$) depends linearly on θ. Therefore, the diffusion curve generation system 102 solves a linear least squares fitting problem by using equation 22 a single time. Moreover, for color optimization, the diffusion curve generation system 102 utilizes a U-static estimator, even for the Hessian term, to avoid the bias introduced by using correlated samples.

Moreover, in some embodiments, for color optimization, the diffusion curve generation system 102 uses a small damping parameter to stabilize the optimization. In particular, the diffusion curve generation system 102 keeps the damping parameter small to minimize the influence on the final colors. Further, in some embodiments, for color optimization, the diffusion curve generation system 102 does not utilize regularization. In one or more embodiments, the diffusion curve generation system 102 takes a large number of sample points in A for equation 22. In contrast to geometry optimization, the color optimization runs much faster because it is a linear least squares problem.

Although the above discussion relates to optimizing diffusion curves, in one or more embodiments, the diffusion curve generation system 102 obtains line segments with endpoint snapping and connects line segments to polylines. In particular, the diffusion curve generation system 102 converts the polylines to Bezier curves using a Potrace algorithm as described in Peter Selinger, 2003, *Potrace: a polygon-based tracing algorithm*. Further, in some embodiments, the diffusion curve generation system 102 extends the optimization methods discussed above to Bezier curves.

In one or more embodiments, the diffusion curve generation system 102 also optimizes for a blur scale. In particular, rather than using a constant Gaussian blur, the diffusion curve generation system 102 optimizes the blur scale across the image domain as described in Stefan Jschke, 2016, *Generalized Diffusion Curves: An Improved Vector Representation for Smooth-Shaded Images*, Computer Graphics Forum 35, 2 (2016), 71-79, Orzan 2008 (mentioned above), and Shuang Zhao, Fredo Durand, and Changxi Zhang, 2018, *Inverse Diffusion Curves Using Shape Optimization*, IEEE Transactions on Visualization and Computer Graphics 24, 7 (2018), 2153-2166.

The above discussion mentions formulating the optimization problem as a source term formulation. In particular, the diffusion curve generation system 102 formulates a Dirichlet boundary optimization problem as a source term optimization problem without the need for secondary walks or stochastic selection of handle existence, both of which lead to a large variance of the estimators (e.g., which leads to inefficiency). In some embodiments, the NEE variant of Walk on Stars discussed above is used for the color optimization step, and the grid-based importance sampling is used by the diffusion curve generation system 102 as an extension to reduce the variance compared to corresponding baselines.

In some embodiments, the diffusion curve generation system 102 further employs extending differential Walk on Stars with reverse walks as discussed in Yang Qi, Dario Seyb, Benedikt Bitterli, and Wojiciech Jarosz, 2022, *A bidirection formulation for Walk on Spheres*, Computer Graphics Forum 41, 4 (2022), 51-62. In particular, the diffusion curve generation system 102 starts a walk from the diffusion handle and uses improved sampling techniques as path guiding (e.g., described in Tianyu Huang, Jingwang Ling, Shuang Zhao, and Feng Xu, 2024, Path Guiding for Monte Carlo PDE solvers, arXiv:2410.18944) or neural control variates described in Zilu Li, Guandao Yang, Qingqing Zhao, xi Deng, Leonidas Guibas, Bharath Hariharan, and Gordon Wetzstein, 2024, Neural control Variates with Automatic Integration, In ACM SIGGRAPH 2024 Conference Papers (Denver, CO, USA) (SIGGRAPH '24), Association for Computing Machinery, New York, NY, USA, Article 10, 9 pages.

In some embodiments, the diffusion curve generation system 102 utilizes caching methods as described in Ghada Bakbouk and Pieter Peers, 2023, Mean Value Caching for Walk on Spheres, in Eurographics Symposium on Rendering, Tobias Ritschel and Andrea Weidlich (Eds.), The Eurographics Association and Bailey Miller, Rohan Sawhney, Keenan Crane, and Ioannis Gkioulekas, 2023, Boundary Value Caching for Walk on Spheres, ACM Trans. Graph 42, 4, Article 82 (July 2023), 11 pages.

In some embodiments, the diffusion curve generation system 102 utilizes a consistency of integrals over multiple iterations of optimization as described in Baptiste Nicolet, Fabrice Rousselle, Jan Novak, Alexander Keller, Wenzel Jakob, and Thomas Muller, 2023, Recursive Control Variates for Inverse Rendering, ACM Trans. Graph, 42, 4, Article 62 (July 2023), 13 pages.

As mentioned above, in some embodiments, a vector graphic image includes sharp color gradient discontinuities around the diffusion handles. As such, the diffusion curve generation system 102 utilizes an additional blur step to smoothen such discontinuities. In particular, the diffusion curve generation system 102 utilizes a freeform gradient method where a biharmonic equation is used in place of the Laplace equation in its construction (e.g., as described in Mark Finch, John Snyder, and Hughes Hoppe, 2011, *Freeform vector graphics with controlled thin-plate splines*, ACM Trans. Graph 30, 6 (December 2011), 1-10.

Figure 7:
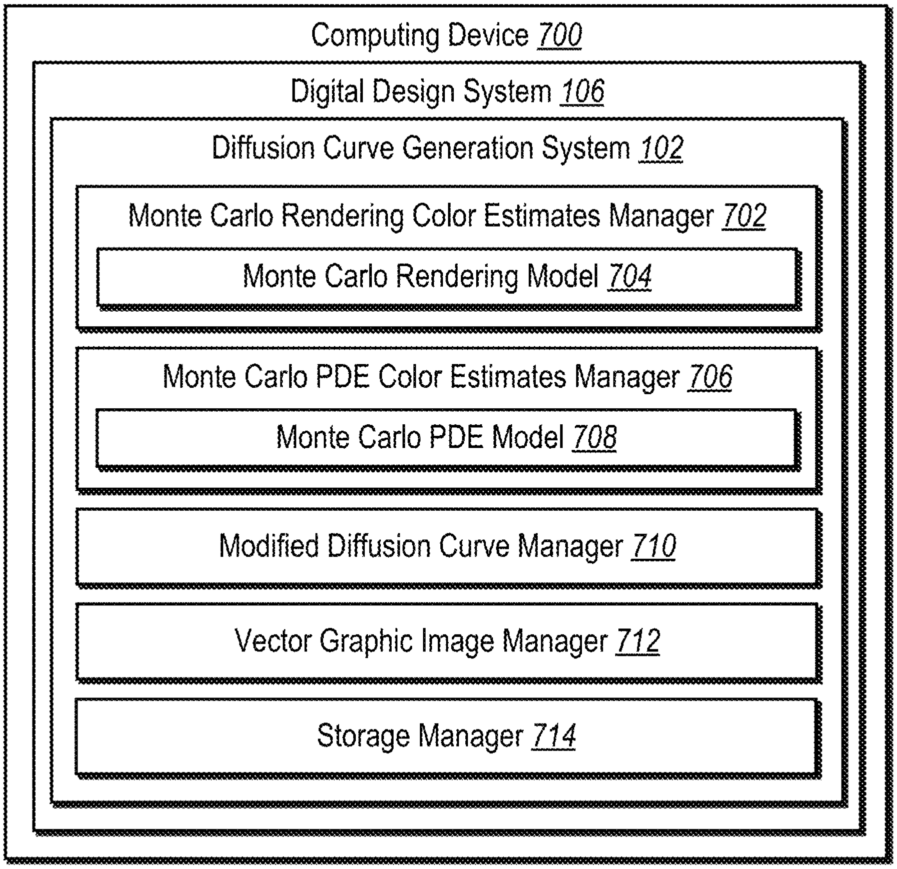
FIG. 7 illustrates a schematic diagram of the diffusion curve generation system in accordance with one or more implementations.

Turning to FIG. 7, additional details will now be provided regarding various components and capabilities of the diffusion curve generation system 102. In particular, FIG. 7 illustrates an example schematic diagram of a computing device 700 (e.g., the server device(s) 104 and/or the client device 112) implementing the diffusion curve generation system 102 in accordance with one or more embodiments of the present disclosure for components 700-714. As illustrated in FIG. 7, the diffusion curve generation system 102 includes a Monte Carlo rendering color estimates manager 702, a Monte Carlo rendering model 704, a Monte Carlo PDE color estimates manager 706, a Monte Carlo PDE model 708, a modified diffusion curve manager 710, a vector graphic image manager 712, and a storage manager 714.

The Monte Carlo rendering color estimates manager 702 responds to a request to render a vector graphic image. For example, the Monte Carlo rendering color estimates manager 702 generates Monte Carlo rendering color estimates in response to a request to render a vector graphic. Specifically, the Monte Carlo rendering color estimates manager 702 arbitrarily queries subpoints of an image of a three-dimensional scene and generates a color estimate for the arbitrarily queried subpoints. For instance, the Monte Carlo rendering color estimates manager 702 generates color estimates and uses those color estimates to create a target image of a three-dimensional digital scene.

The Monte Carlo rendering color estimates manager 702 works with the Monte Carlo rendering model 704. Specifically, the Monte Carlo rendering model 704 simulates rays of light coming from a camera angle and how the ray of light moves within an image domain. Furthermore, the Monte Carlo rendering model 704 estimates Monte Carlo rendering color estimates for queried points within the image domain to construct a target image. In particular, the diffusion curve generation system 102 utilizes the Monte Carlo rendering model 704 to sample noisy samples from the three-dimensional digital scene.

The Monte Carlo PDE color estimates manager 706 also generates color estimates. Specifically, the Monte Carlo PDE color estimates manager 706 generates Monte Carlo PDE color estimates for corresponding subpositions within a target image (e.g., generated by the Monte Carlo rendering color estimates manager 702). In some embodiments, the Monte Carlo PDE color estimates manager 706 generates the Monte Carlo PDE color estimates from diffusion handles of a diffusion curve. Accordingly, the Monte Carlo PDE color estimates manager 706 generates the Monte Carlo PDE color estimates to further create a reconstructed image (e.g., a reconstruction of the three-dimensional digital scene) in a vector format.

The Monte Carlo PDE model 708 works with the Monte Carlo PDE color estimates manager 708. Specifically, the Monte Carlo PDE model 708 uses a Walk on Stars method modified by various additional models to optimize for position, existence, and colors of diffusion handles. For instance, the Monte Carlo PDE model 708 is parameterized by a diffusion curve and from Monte Carlo PDE color estimates generated by the Monte Carlo PDE color estimates manager 706, the Monte Carlo PDE model 708 updates a diffusion curve.

The modified diffusion curve manager 710 modifies diffusion handles in a diffusion curve. In particular, the modified diffusion curve manager 710 compares a plurality of Monte Carlo rendering color estimates with Monte Carlo PDE color estimates to determine a difference between the two. In some embodiments, the modified diffusion curve manager 710 determines a loss gradient estimate between the different color estimates and then further generates a modified diffusion curve based on the loss gradient. In some embodiments, the modified diffusion curve manager 710 generates loss Hessian estimate to also aid in generating a modified diffusion curve.

The vector graphic image manager 712 obtains a modified diffusion curve from the modified diffusion curve manager 710. In particular, the vector graphic image manager 712 generates a vector graphic image of a three-dimensional scene from the modified diffusion curve. In some embodiments, the vector graphic image manager 712 interpolates color values from the modified diffusion curve to determine how colors are distributed across a vector graphic image. Moreover, in some embodiments, the vector graphic image manager 712 provides the vector graphic image to a graphical user interface of a client device (e.g., a user of a client device that submitted a request to render a vector graphic image from a three-dimensional digital scene).

The storage manager 714 stores various components discussed in FIG. 7. For example, the storage manager 714 stores the three-dimensional digital scenes, requests to render vector graphic images, Monte Carlo rendering color estimates, Monte Carlo PDE color estimates, a target image, an image of the three-dimensional digital scene, a reconstructed image, a diffusion curve, a modified diffusion curve, and vector graphic images. Additionally, the storage manager 714 also stores optimization components of the Monte Carlo PDE model 708 (e.g., each iteration of modifying position, existence, and color of diffusion handles).

Each of the components 700-714 of the diffusion curve generation system 102 include software, hardware, or both. For example, the components 700-714 include one or more instructions stored on a computer-readable storage medium and executable by processors of one or more computing devices, such as a client device or server device. When executed by the one or more processors, the computer-executable instructions of the diffusion curve generation system 102 cause the computing device(s) to perform the methods described herein. Alternatively, the components 700-714 include hardware, such as a special-purpose processing device to perform a certain function or group of functions. Alternatively, the components 700-714 of the diffusion curve generation system 102 include a combination of computer-executable instructions and hardware.

Furthermore, the components 700-714 of the diffusion curve generation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 700-714 of the diffusion curve generation system 102 may be implemented as a stand-alone application, such as a desktop or mobile application. Furthermore, the components 700-714 of the diffusion curve generation system 102 may be implemented as one or more web-based applications hosted on a remote server. Alternatively, or additionally, the components 700-714 of the diffusion curve generation system 102 may be implemented in a suite of mobile device applications or "apps." For example, in one or more embodiments, the diffusion curve generation system 102 comprise or operate in connection with digital software applications such as ADOBE® PHOTOSHOP CC, ADOBE® PHOTOSHOP CAMERA, ADOBE® CREATIVE CLOUD, ADOBE® PHOTOSHOP ELEMENTS, and ADOBE® ILLUSTRATOR CC.

FIGS. 1-7, the corresponding text, and the examples provide a number of different methods, systems, devices, and non-transitory computer-readable media of the components 700-714. In addition to the foregoing, one or more embodiments are described in terms of flowcharts comprising acts for accomplishing the particular result. For example, FIG. 8 illustrates a flowchart of example sequences of acts in accordance with one or more embodiments.

Figure 8:
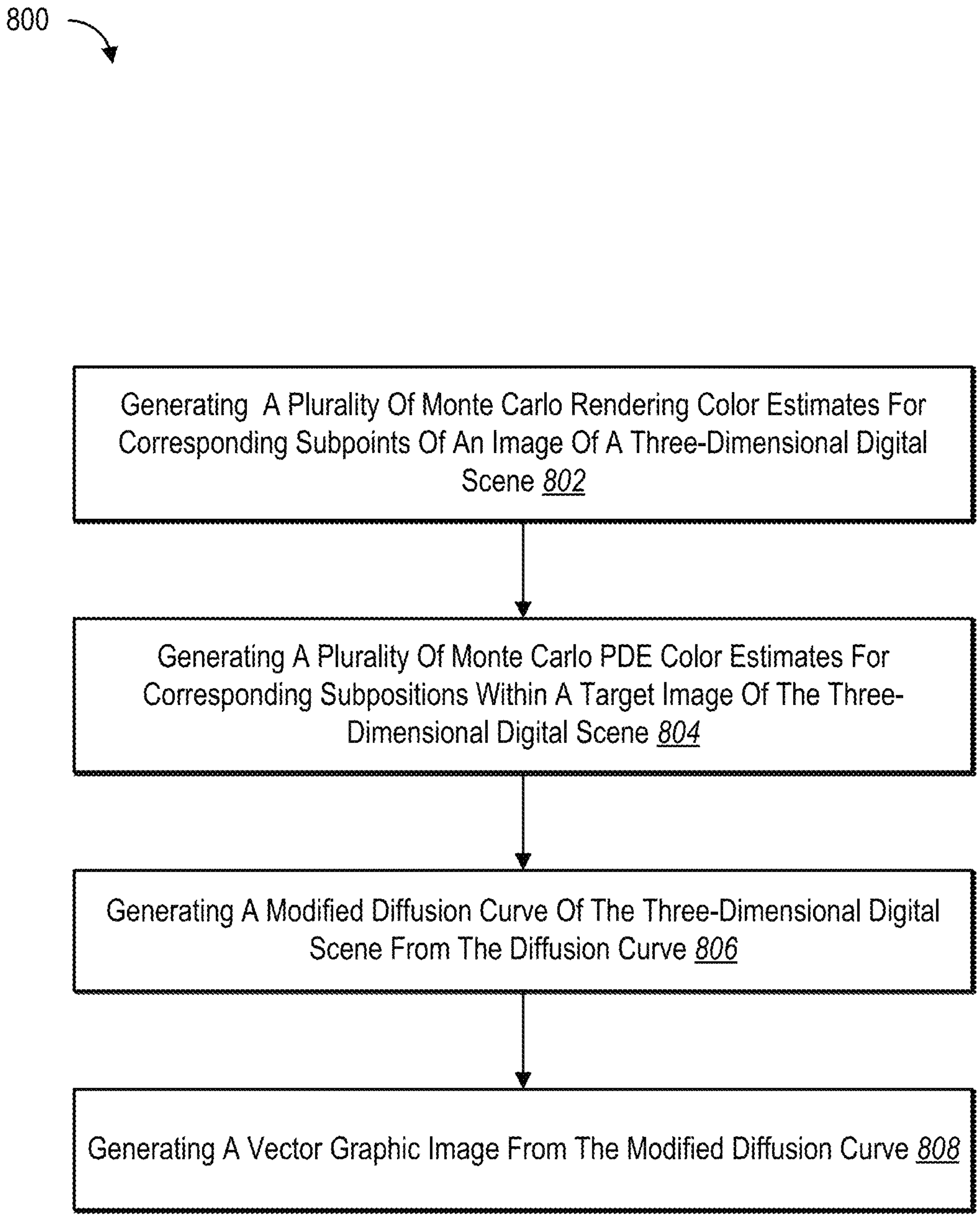
FIG. 8 illustrates a flowchart of a series of acts for generating a modified diffusion curve in accordance with one or more implementations.

FIG. 8 illustrates a flowchart of a series of acts 800 for generating a modified diffusion curve in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium stores instructions thereon that, when executed by at least one processor, cause a computing device to perform the acts of FIG. 8. In some embodiments, a system performs the acts of FIG. 8. For example, in one or more embodiments, a system includes at least one memory device. The system further includes at least one server device configured to cause the system to perform the acts of FIG. 8.

The series of acts 800 includes an act 802 of generating a plurality of Monte Carlo rendering color estimates for corresponding subpoints of an image of a three-dimensional digital scene. Further, the series of acts 800 includes an act 804 of generating a plurality of Monte Carlo PDE color estimates for corresponding subpositions within a target image of the three-dimensional digital scene. Moreover, the series of acts 800 includes an act 806 of generating a modified diffusion curve of the three-dimensional digital scene from the diffusion curve. Further, the series of acts 800 includes an act 808 of generating a vector graphic image from the modified diffusion curve.

In particular, the act 802 includes in response to a request to render a vector graphic image from a three-dimensional digital scene, generating, utilizing a Monte Carlo rendering model, a plurality of Monte Carlo rendering color estimates for corresponding subpoints of an image of the three-dimensional digital scene. Further, the act 804 includes generating, utilizing a Monte Carlo partial differential equation (PDE) model parameterized by a diffusion curve, a plurality of Monte Carlo PDE color estimates for corresponding subpositions within a target image of the three-dimensional digital scene. Moreover, the act 806 includes generating a modified diffusion curve of the three-dimensional digital scene from the diffusion curve by comparing the plurality of Monte Carlo rendering color estimates and the Monte Carlo PDE color estimates. Further, the act 808 includes generating the vector graphic image of the three-dimensional digital scene from the modified diffusion curve.

For example, in one or more embodiments, the series of acts 800 includes generating a loss gradient estimate by comparing the plurality of Monte Carlo rendering color estimates and the Monte Carlo PDE color estimates. In addition, in one or more embodiments, the series of acts 800 includes generating the modified diffusion curve based on the loss gradient estimate. Further, in one or more embodiments, the series of acts 800 includes wherein generating the plurality of Monte Carlo PDE color estimates comprises generating the plurality of Monte Carlo PDE color estimates from a plurality of diffusion handles of the diffusion curve, wherein the plurality of diffusion handles comprises a plurality of colors and a plurality of positions. Further, in some embodiments, the series of acts 800 includes wherein generating the modified diffusion curve comprises generating a plurality of modified diffusion handles based on the loss gradient estimate.

Moreover, in one or more embodiments, the series of acts 800 includes generating the modified diffusion curve by generating a plurality of modified color values for the plurality of modified diffusion handles based on the loss gradient estimate. Further, in one or more embodiments, the series of acts 800 includes generating a loss Hessian estimate utilizing a Gauss-Newton optimization model. Moreover, in one or more embodiments, the series of acts 800 includes generating a plurality of modified positions for the modified diffusion curve based on the loss gradient estimate and the loss Hessian estimate. Further, in one or more embodiments, the series of acts 800 includes removing a subset of diffusion handles from the plurality of diffusion handles of the diffusion curve such that the modified diffusion curve has a reduced number of total diffusion handles relative to the diffusion curve.

Moreover, in one or more embodiments, the series of acts 800 includes selecting the subset of diffusion handles of the diffusion curve utilizing a Poisson source evaluation model that weights diffusion handles by modeling gradients with respect to diffusion handle existence. Additionally, in one or more embodiments, the series of acts 800 includes generating existence probabilities for the plurality of diffusion handles. In one or more embodiments, the series of acts 800 includes generating a sparsity loss for the plurality of diffusion handles. In one or more embodiments, the series of acts 800 includes removing the subset of diffusion handles from the plurality of diffusion handles to generate the modified diffusion curve based on the existence probabilities and the sparsity loss. Moreover, in one or more embodiments, series of acts 800 includes utilizing the modified positions and the modified colors of the modified diffusion curve to generate colors for the vector graphic image.

in one or more embodiments, the series of acts 800 includes generating, utilizing a Monte Carlo rendering model, a plurality of Monte Carlo rendering color estimates of a three-dimensional digital scene. In addition, in one or more embodiments, the series of acts 800 includes generating, utilizing a Monte Carlo partial differential equation (PDE) model and a diffusion curve comprising a plurality of diffusion handles, a plurality of Monte Carlo PDE color estimates. Further, in one or more embodiments, the series of acts 800 includes generating a loss gradient estimate by comparing the plurality of Monte Carlo rendering color estimates and the Monte Carlo PDE color estimates. Further, in some embodiments, the series of acts 800 includes generating a modified diffusion curve of the three-dimensional digital scene utilizing the loss gradient estimate, the modified diffusion curve comprising a plurality of modified diffusion handles. Moreover, in some embodiments, the series of acts 800 includes generating a vector graphic image of the three-dimensional digital scene from the plurality of modified diffusion handles of the modified diffusion curve.

In one or more embodiments, the series of acts 800 includes generating the plurality of Monte Carlo PDE color estimates utilizing the diffusion curve comprising the plurality of diffusion handles comprises generating the plurality of Monte Carlo PDE color estimates from a plurality of colors and a plurality of positions for the diffusion handles. Furthermore, in one or more embodiments, the series of acts 800 includes generating the modified diffusion curve of the three-dimensional digital scene comprises generating a plurality of modified colors and a plurality of modified positions relative to the diffusion handles.

Moreover, in one or more embodiments, the series of acts 800 includes based on comparing the plurality of Monte Carlo rendering color estimates and the Monte Carlo PDE color estimates, generating a loss Hessian estimate. Moreover, in one or more embodiments, the series of acts 800 includes generating the modified diffusion curve comprising a plurality of modified positions based on the loss gradient estimate and the loss Hessian estimate. Further, in one or more embodiments, the series of acts 800 includes identifying a subset of diffusion handles of the plurality of diffusion handles based on the loss gradient estimate. In one or more embodiments, the series of acts 800 includes removing the subset of diffusion handles from the plurality of diffusion handles of the diffusion curve such that the modified diffusion curve has a reduced number of total diffusion handles relative to the diffusion curve.

Moreover, in one or more embodiments, the series of acts 800 includes selecting the subset of diffusion handles of the diffusion curve utilizing a Poisson source evaluation model that weights diffusion handles by modeling gradients with respect to diffusion handle existence. Further, in one or more embodiments, the series of acts 800 includes performing a first optimization iteration to remove one or more diffusion handles from the plurality of diffusion handles of the diffusion curve and to generate modified positions of the plurality of diffusion handles relative to the plurality of diffusion handles.

Moreover, in some embodiments, the series of acts 800 includes performing a second optimization iteration to generate modified colors of the plurality of modified diffusion handles relative to the diffusion handles. Further, in some embodiments, the series of acts 800 includes wherein generating the vector graphic image comprises generating the vector graphic image utilizing the modified positions and the modified colors of the modified diffusion curve.

Moreover, in some embodiments, the series of acts 800 includes generating the plurality of Monte Carlo PDE color estimates from a plurality of diffusion handles of the diffusion curve, wherein the plurality of diffusion handles comprises a plurality of colors and a plurality of positions. Furthermore, in one or more embodiments, the series of acts 800 includes generating the modified diffusion curve comprising a plurality of modified diffusion handles by modifying the plurality of diffusion handles to include a plurality of modified colors and a plurality of modified positions relative to colors and positions of the plurality of diffusion handles. Moreover, in one or more embodiments, the series of acts 800 includes generating a loss gradient estimate by comparing the plurality of Monte Carlo rendering color estimates and the Monte Carlo PDE color estimates. Further, in one or more embodiments, the series of acts 800 includes generating a loss Hessian estimate using a Gauss-Newton optimization model. In one or more embodiments, the series of acts 800 includes generating the modified diffusion curve comprises generating a plurality of modified diffusion handles based on the loss gradient estimate and the loss Hessian estimate.

In addition, in one or more embodiments, the series of acts 800 includes selecting a subset of diffusion handles of the diffusion curve utilizing a Poisson source evaluation model that weights diffusion handles by modeling gradients with respect to diffusion handle existence. Further, in one or more embodiments, the series of acts 800 includes removing the subset of diffusion handles from a plurality of diffusion handles of the diffusion curve such that the modified diffusion curve has a reduced number of total diffusion handles relative to the diffusion curve.

Further, in some embodiments, the series of acts 800 includes performing a first optimization iteration to remove one or more diffusion handles from a plurality of diffusion handles of the diffusion curve and to generate modified positions of the plurality of diffusion handles relative to positions of the plurality of diffusion handles. Furthermore, in one or more embodiments, the series of acts 800 includes performing a second optimization iteration to generate modified colors of the plurality of modified diffusion handles relative to the diffusion handles. Furthermore, in one or more embodiments, the series of acts 800 includes wherein generating the vector graphic image comprises utilizing the modified positions and the modified colors of the modified diffusion curve to generate colors for the vector graphic image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
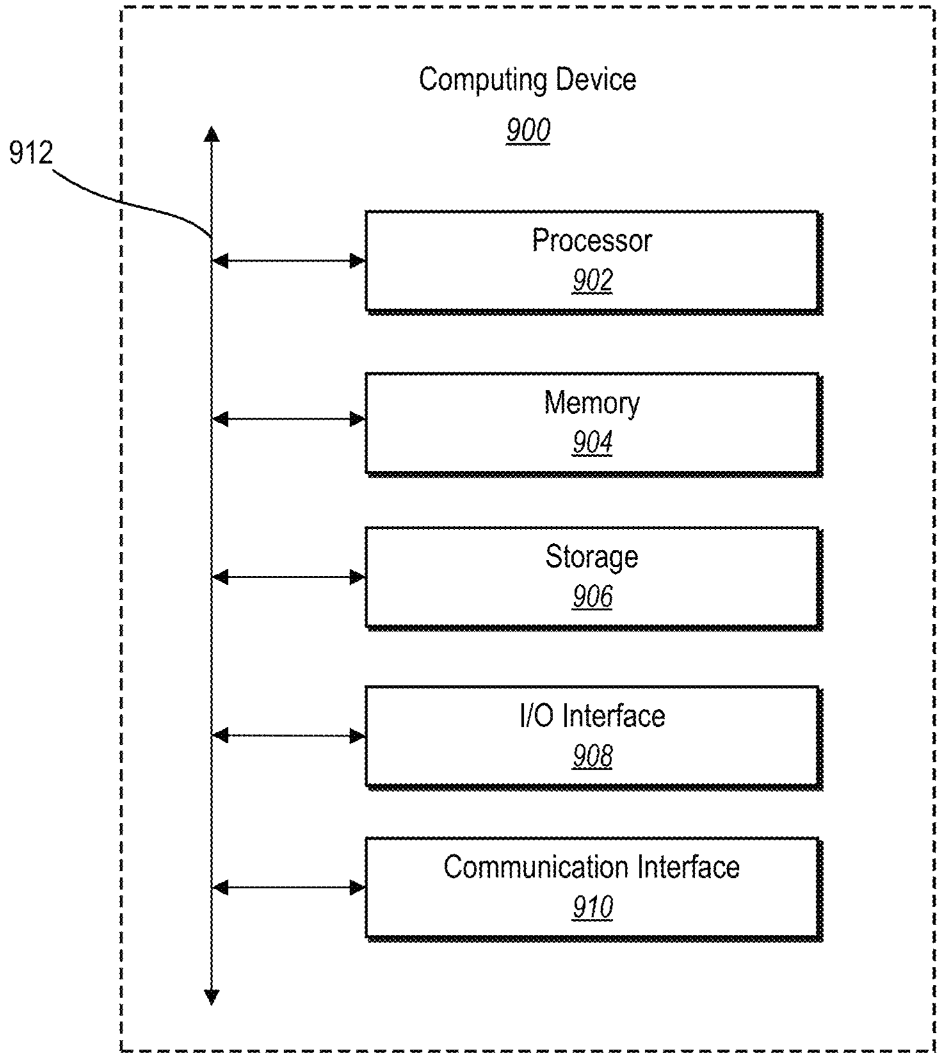
FIG. 9 illustrates a block diagram of an exemplary computing device in accordance with one or more implementations.

FIG. 9 illustrates a block diagram of an example computing device 900 that may be configured to perform one or more of the processes described above. One will appreciate that one or more computing devices, such as the computing device 900 may represent the computing devices described above (e.g., the server device(s) 104 and/or the client device 112). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 include hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

in response to a request to render a vector graphic image from a three-dimensional digital scene, generating, utilizing a Monte Carlo rendering model, a plurality of Monte Carlo rendering color estimates for corresponding subpoints of an image of the three-dimensional digital scene;

generating, utilizing a Monte Carlo partial differential equation (PDE) model parameterized by a diffusion curve, a plurality of Monte Carlo PDE color estimates for corresponding subpositions within a target image of the three-dimensional digital scene;

generating a modified diffusion curve of the three-dimensional digital scene from the diffusion curve by comparing the plurality of Monte Carlo rendering color estimates and the Monte Carlo PDE color estimates; and generating the vector graphic image of the three-dimensional digital scene from the modified diffusion curve.

2. The computer-implemented method of claim 1, wherein generating the modified diffusion curve comprises:

generating a loss gradient estimate by comparing the plurality of Monte Carlo rendering color estimates and the Monte Carlo PDE color estimates; and generating the modified diffusion curve based on the loss gradient estimate.

3. The computer-implemented method of claim 2, wherein generating the plurality of Monte Carlo PDE color estimates comprises generating the plurality of Monte Carlo PDE color estimates from a plurality of diffusion handles of the diffusion curve, wherein the plurality of diffusion handles comprises a plurality of colors and a plurality of positions; and wherein generating the modified diffusion curve comprises generating a plurality of modified diffusion handles based on the loss gradient estimate.

4. The computer-implemented method of claim 3, further comprising generating the modified diffusion curve by generating a plurality of modified color values for the plurality of modified diffusion handles based on the loss gradient estimate.

5. The computer-implemented method of claim 4, further comprising generating the modified diffusion curve by:

generating a loss Hessian estimate utilizing a Gauss-Newton optimization model; and generating a plurality of modified positions for the modified diffusion curve based on the loss gradient estimate and the loss Hessian estimate.

6. The computer-implemented method of claim 3, wherein generating the modified diffusion curve comprises removing a subset of diffusion handles from the plurality of diffusion handles of the diffusion curve such that the modified diffusion curve has a reduced number of total diffusion handles relative to the diffusion curve.

7. The computer-implemented method of claim 6, wherein removing the subset of diffusion handles from the plurality of diffusion handles of the diffusion curve comprises:

selecting the subset of diffusion handles of the diffusion curve utilizing a Poisson source evaluation model that weights diffusion handles by modeling gradients with respect to diffusion handle existence.

8. The computer-implemented method of claim 6, wherein generating the modified diffusion curve comprises:

generating existence probabilities for the plurality of diffusion handles;

generating a sparsity loss for the plurality of diffusion handles; and removing the subset of diffusion handles from the plurality of diffusion handles to generate the modified diffusion curve based on the existence probabilities and the sparsity loss.

9. The computer-implemented method of claim 5, wherein generating the vector graphic image comprises utilizing the modified positions and the modified colors of the modified diffusion curve to generate colors for the vector graphic image.

10. A system comprising:

one or more memory devices; and one or more processors coupled to the one or more memory devices that cause the system to perform operations comprising:

generating, utilizing a Monte Carlo rendering model, a plurality of Monte Carlo rendering color estimates of a three-dimensional digital scene;

generating, utilizing a Monte Carlo partial differential equation (PDE) model and a diffusion curve comprising a plurality of diffusion handles, a plurality of Monte Carlo PDE color estimates;

generating a loss gradient estimate by comparing the plurality of Monte Carlo rendering color estimates and the Monte Carlo PDE color estimates;

generating a modified diffusion curve of the three-dimensional digital scene utilizing the loss gradient estimate, the modified diffusion curve comprising a plurality of modified diffusion handles; and generating a vector graphic image of the three-dimensional digital scene from the plurality of modified diffusion handles of the modified diffusion curve.

11. The system of claim 10, wherein:

generating the plurality of Monte Carlo PDE color estimates utilizing the diffusion curve comprising the plurality of diffusion handles comprises generating the plurality of Monte Carlo PDE color estimates from a plurality of colors and a plurality of positions for the diffusion handles; and generating the modified diffusion curve of the three-dimensional digital scene comprises generating a plurality of modified colors and a plurality of modified positions relative to the diffusion handles.

12. The system of claim 10, wherein generating the modified diffusion curve comprises:

based on comparing the plurality of Monte Carlo rendering color estimates and the Monte Carlo PDE color estimates, generating a loss Hessian estimate; and generating the modified diffusion curve comprising a plurality of modified positions based on the loss gradient estimate and the loss Hessian estimate.

13. The system of claim 10, wherein generating the modified diffusion curve comprises:

identifying a subset of diffusion handles of the plurality of diffusion handles based on the loss gradient estimate; and removing the subset of diffusion handles from the plurality of diffusion handles of the diffusion curve such that the modified diffusion curve has a reduced number of total diffusion handles relative to the diffusion curve.

14. The system of claim 13, wherein removing the subset of diffusion handles comprises selecting the subset of diffusion handles of the diffusion curve utilizing a Poisson source evaluation model that weights diffusion handles by modeling gradients with respect to diffusion handle existence.

15. The system of claim 14, wherein generating the modified diffusion curve comprises:

performing a first optimization iteration to remove one or more diffusion handles from the plurality of diffusion handles of the diffusion curve and to generate modified positions of the plurality of diffusion handles relative to the plurality of diffusion handles;

performing a second optimization iteration to generate modified colors of the plurality of modified diffusion handles relative to the diffusion handles; and wherein generating the vector graphic image comprises generating the vector graphic image utilizing the modified positions and the modified colors of the modified diffusion curve.

16. A non-transitory computer-readable medium comprising instructions that, when executed by at least one processor, cause the at least one processor to perform operations comprising:

in response to a request to render a vector graphic image from a three-dimensional digital scene, generating, utilizing a Monte Carlo rendering model, a plurality of Monte Carlo rendering color estimates for corresponding subpoints of an image of the three-dimensional digital scene;

generating, utilizing a Monte Carlo partial differential equation (PDE) model parameterized by a diffusion curve, a plurality of Monte Carlo PDE color estimates for corresponding subpositions within a target image of the three-dimensional digital scene;

generating a modified diffusion curve of the three-dimensional digital scene from the diffusion curve by comparing the plurality of Monte Carlo rendering color estimates and the Monte Carlo PDE color estimates; and generating the vector graphic image of the three-dimensional digital scene from the modified diffusion curve.

17. The non-transitory computer-readable medium of claim 16, wherein generating the modified diffusion curve comprises:

generating the plurality of Monte Carlo PDE color estimates from a plurality of diffusion handles of the diffusion curve, wherein the plurality of diffusion handles comprises a plurality of colors and a plurality of positions; and generating the modified diffusion curve comprising a plurality of modified diffusion handles by modifying the plurality of diffusion handles to include a plurality of modified colors and a plurality of modified positions relative to colors and positions of the plurality of diffusion handles.

18. The non-transitory computer-readable medium of claim 16, wherein generating the modified diffusion curve comprises:

generating a loss gradient estimate by comparing the plurality of Monte Carlo rendering color estimates and the Monte Carlo PDE color estimates;

generating a loss Hessian estimate using a Gauss-Newton optimization model; and generating the modified diffusion curve comprises generating a plurality of modified diffusion handles based on the loss gradient estimate and the loss Hessian estimate.

19. The non-transitory computer-readable medium of claim 16, wherein generating the modified diffusion curve comprises:

selecting a subset of diffusion handles of the diffusion curve utilizing a Poisson source evaluation model that weights diffusion handles by modeling gradients with respect to diffusion handle existence; and removing the subset of diffusion handles from a plurality of diffusion handles of the diffusion curve such that the modified diffusion curve has a reduced number of total diffusion handles relative to the diffusion curve.

20. The non-transitory computer-readable medium of claim 16, wherein generating the modified diffusion curve comprises:

performing a first optimization iteration to remove one or more diffusion handles from a plurality of diffusion handles of the diffusion curve and to generate modified positions of the plurality of diffusion handles relative to positions of the plurality of diffusion handles;

performing a second optimization iteration to generate modified colors of the plurality of modified diffusion handles relative to the diffusion handles;

wherein generating the vector graphic image comprises utilizing the modified positions and the modified colors of the modified diffusion curve to generate colors for the vector graphic image.

* * * * *